(12) United States Patent
Deng et al.

(10) Patent No.: US 11,450,895 B2
(45) Date of Patent: Sep. 20, 2022

(54) ELECTRIC TOOL AND METHOD FOR SUPPLYING POWER TO ELECTRIC TOOL

(71) Applicant: Positec Power Tools (Suzhou) Co., Ltd, Suzhou (CN)

(72) Inventors: Qiang Deng, Jiangsu (CN); Mingming Chen, Jiangsu (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 276 days.

(21) Appl. No.: 16/641,519

(22) PCT Filed: Aug. 27, 2018

(86) PCT No.: PCT/CN2018/102541
§ 371 (c)(1),
(2) Date: Feb. 25, 2020

(87) PCT Pub. No.: WO2019/037793
PCT Pub. Date: Feb. 28, 2019

(65) Prior Publication Data
US 2021/0159548 A1 May 27, 2021

(30) Foreign Application Priority Data

Aug. 25, 2017 (CN) .......................... 201710742943.5

(51) Int. Cl.
*H01M 10/42* (2006.01)
*H02J 7/00* (2006.01)
*H02P 7/00* (2016.01)

(52) U.S. Cl.
CPC ........ *H01M 10/425* (2013.01); *H02J 7/0063* (2013.01); *H02P 7/00* (2013.01); *H01M 2220/30* (2013.01)

(58) Field of Classification Search
CPC ............. H01M 10/425; H01M 2220/30; H02J 7/0063; H02P 7/00
See application file for complete search history.

(56) References Cited

U.S. PATENT DOCUMENTS

2017/0346334 A1* 11/2017 Mergener .................. H02J 9/06

FOREIGN PATENT DOCUMENTS

| CN | 1989674 A | 6/2007 |
|---|---|---|
| CN | 101064363 A | 10/2007 |
| CN | 204179727 U | 2/2015 |

(Continued)

*Primary Examiner* — Carlos Amaya
(74) *Attorney, Agent, or Firm* — Dentons US LLP

(57) ABSTRACT

The present disclosure relates to an electric tool and a power supply method for an electric tool. The electric tool includes: a housing; a motor, accommodated in the housing; battery pack mounting portions, at least two battery packs being detachably mounted in the battery pack mounting portions; a main switch, being in an open state or a closed state according to an operation of a user, when the main switch is in a closed state, the battery packs are capable of supplying power to the motor, and when the main switch is in an open state, the battery packs stop supplying power to the motor; and a control assembly, detecting a state of the main switch, when the main switch is in an open state, the control assembly controls transfer of electric energy of a battery pack with a high voltage to a battery pack with a low voltage of the at least two battery packs.

14 Claims, 15 Drawing Sheets

(56) References Cited

FOREIGN PATENT DOCUMENTS

| | | | |
|---|---|---|---|
| CN | 104753128 | A | 7/2015 |
| CN | 106233915 | A | 12/2016 |
| CN | 106450071 | A | 2/2017 |
| DE | 19533543 | A1 | 3/1996 |
| DE | 10-2007-027902 | A1 | 12/2009 |
| JP | 2005243369 | A | 9/2005 |
| JP | 2007166747 | A | 6/2007 |
| JP | 4557569 | A | 10/2010 |
| JP | 4633615 | A | 2/2011 |
| WO | 2014119184 | A1 | 8/2014 |

* cited by examiner

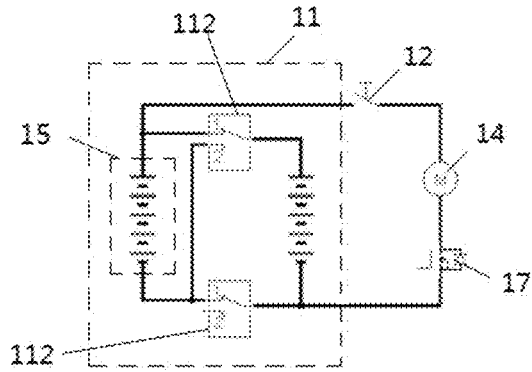
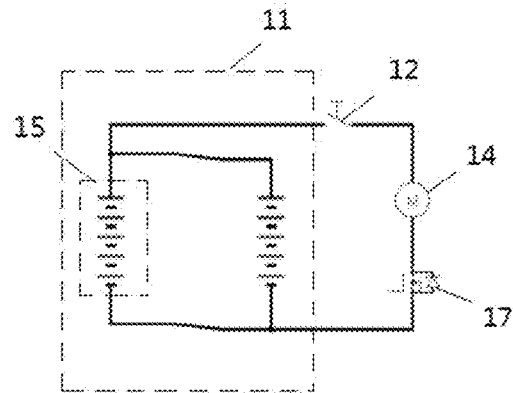
FIG. 3a  FIG. 3b
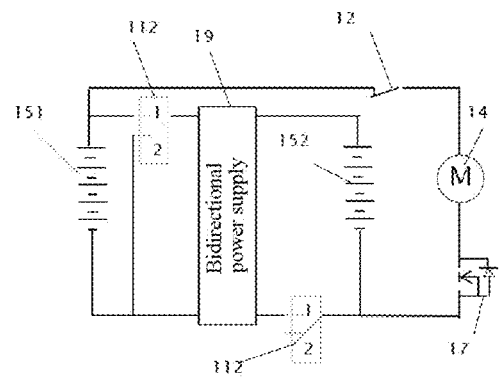
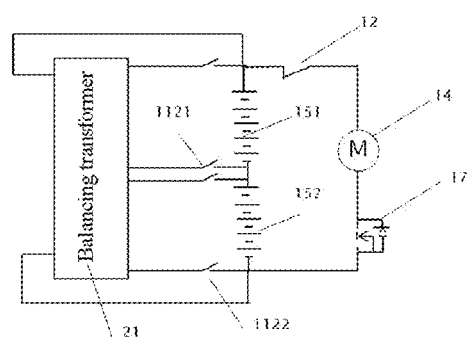
FIG. 4  FIG. 5
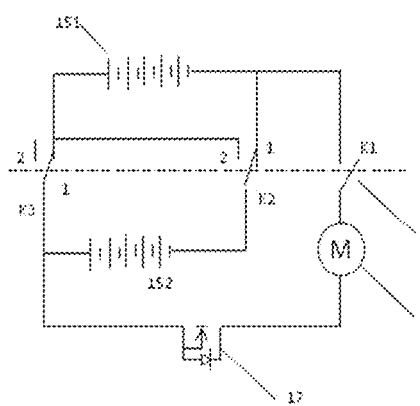
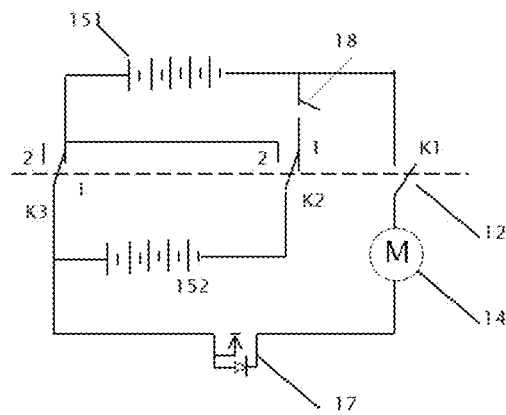
FIG. 6a  FIG. 6b

ELECTRIC TOOL AND METHOD FOR SUPPLYING POWER TO ELECTRIC TOOL

This application is a National Stage application of International Application No. PCT/CN2018/102541 filed Aug. 27, 2018, and claims priority to Chinese Application No. 201710742943.5 filed Aug. 25, 2017, each of which are hereby incorporated by reference in their entirety as if fully set forth herein.

TECHNICAL FIELD

Embodiments of the present invention relates to the field of electric tool technologies, and in particular, to an electric tool and a power supply method for an electric tool.

RELATED ART

An electric tool is a widely used work tool. A power supply assembly (for example, a battery pack) is usually loaded to supply a current to the electric tool to drive a load (for example, an electric motor) to rotate, to further drive a work head through a transmission assembly (for example, a reciprocating mechanism) to work.

In the related art, a plurality of battery packs are used in a power supply assembly to supply power in an increasingly large number of electric tool products. For example, a plurality of battery packs connected in series are used to improve a power output of an electric tool. However, the plurality of battery packs connected in series may be in different states (for example, have different remaining powers). For example, some battery packs have relatively low powers, or a plurality of battery packs have relatively large voltage differences. Because the battery packs are connected in series, the power of the battery pack with the lowest power is used as a total power of an entire battery pack group. When the total power is less than a preset value, the electric tool cannot be turned on, resulting in a reduced total work time and lower use efficiency of the electric tool.

Therefore, how to perform power balancing on a plurality of battery packs connected in series, improve the work efficiency of an entire battery pack group, and extend the work time of an electric tool are problems that need to be solved urgently.

SUMMARY

In view of this, the present invention provides an electric tool and a power supply method for an electric tool.

According to a first aspect of the present invention, an electric tool is provided, including: a housing; a motor, accommodated in the housing; battery pack mounting portions, at least two battery packs being detachably mounted in the battery pack mounting portions, wherein each of the battery packs comprises a battery pack housing and a plurality of cells disposed in the battery pack housing; a main switch, being in an open state or a closed state according to an operation of a user, wherein when the main switch is in a closed state, the battery packs are capable of supplying power to the motor, and when the main switch is in an open state, the battery packs stop supplying power to the motor; and a control assembly, detecting a state of the main switch, wherein when the main switch is in an open state, the control assembly controls transfer of electric energy of a battery pack with a high voltage to a battery pack with a low voltage of the at least two battery packs.

In one embodiment, further comprising a switching switch connected to the battery pack mounting portions, wherein the control assembly controls the switching switch to switch between a first state and a second state, and when the main switch is in an open state, the control assembly controls the switching switch to switch to the first state, so that the at least two battery packs are connected in parallel to enable a battery pack with a high voltage to charge a battery pack with a low voltage.

In one embodiment, wherein when the main switch is closed, the control assembly controls the switching switch to switch to the second state, so that the at least two battery packs are connected in series to supply power to the motor.

In one embodiment, further comprising a balancing transformer and a balancing switch, wherein the balancing transformer is a multi-winding same-core transformer, the at least two battery packs are separately connected to a winding of the same-core transformer through two balancing switches, and when the main switch is in an open state, the control assembly controls two balancing switch connected to the low-voltage battery pack to close, so that the at least two battery packs are connected in series to enable a battery pack with a high voltage to charge a battery pack with a low voltage through the balancing transformer.

In one embodiment, wherein when the main switch is in a closed state, the control assembly controls two balancing switch connected to the low-voltage battery pack to close, so that the at least two battery packs are connected in series to enable a battery pack with a high voltage to charge a battery pack with a low voltage through the balancing transformer.

In one embodiment, wherein the main switch comprises the switching switch, the main switch is a single-pole multi-throw switch formed by linkage of a first switch, a second switch, and a third switch, the first switch is electrically connected to the battery packs and the motor, the second switch and the third switch are separately located between the at least two battery packs, and when the first switch is in an open state according to an operation of the user, the linked second switch and third switch are separately in the first state, so that the at least two battery packs are connected in parallel to enable a battery pack with a high voltage to charge a battery pack with a low voltage.

In one embodiment, further comprising a fourth switch, wherein one end of the fourth switch is connected to the second switch of the single-pole multi-throw switch, the other end is connected to the first switch of the single-pole multi-throw switch and negative electrodes of one of the battery packs, and when the main switch is in an open state, and the control assembly controls the fourth switch to close when the parameters of at least two battery packs meet a preset condition, and controls the at least two battery packs to be connected in parallel to enable a battery pack with a high voltage to charge a battery pack with a low voltage.

In one embodiment, further the switching switch comprising at least two switching switches separately connected between the at least two battery packs, wherein the control assembly controls states of the at least two switching switches, and when the main switch is open, the control assembly controls the switching switch to be in the first state, so that the at least two battery packs are connected in parallel to enable a battery pack with a high voltage to charge a battery pack with a low voltage.

In one embodiment, wherein the at least two battery packs comprise a first battery pack and a second battery pack, the at least two switching switch comprises a first switching switch and a second switching switch, the control assembly comprises a bidirectional power supply, and the bidirectional power supply comprises a first input terminal, a second input terminal, a first output terminal, and a second output terminal, the first input terminal is electrically connected to a positive electrode of the first battery pack by the first switching switch, the first output terminal is electrically connected to a negative electrode of the first battery pack, the second input terminal is electrically connected to a positive electrode of the second battery pack, the second output terminal is electrically connected to a negative electrode of the second battery pack by the second switching switch, and when the main switch is open, the control assembly controls the first switching switch and the second switching switch to be separately in the first state, so that the bidirectional power supply controls a battery pack with a high voltage to charge a battery pack with a low voltage by using a preset charging current.

In one embodiment, wherein when the main switch is closed, the control assembly controls the first switching switch and the second switching switch to be separately in the second state, and the at least two battery packs are connected in series to supply power to the motor.

In one embodiment, further comprising a parameter measurement module, wherein the parameter measurement module is electrically connected to the control assembly, the control assembly obtains state parameters, detected by the parameter measurement module, of the battery packs, and determines whether the parameters of the battery packs meet a preset condition, and when the state parameters of the battery packs meet the preset condition, the control assembly controls transfer of electric energy of a battery pack with a high voltage to a battery pack with a low voltage of the at least two battery packs.

In one embodiment, wherein when the battery packs do not meet a parallel connection mutual charging condition, the control assembly controls the at least two battery packs to be connected in series to each other or to be not electrically connected.

In one embodiment, wherein the preset condition comprises at least one of the following: determining, based on the state parameters, that temperatures of the battery packs are within a first temperature interval in which mutual charging can be performed; or determining, based on the state parameters, that a voltage difference between the battery packs is within a first voltage difference interval in which mutual charging can be performed.

In one embodiment, further comprising a self-locking control assembly, wherein one end of the self-locking control assembly is connected to the battery packs, the other end is separately connected to the main switch and the control assembly, the self-locking control assembly comprises a capacitor assembly and a MOS transistor, a first end of the capacitor assembly is separately connected to the battery packs, the main switch, and the MOS transistor, and a second end of the capacitor is connected to the control assembly, when the battery packs are mounted into the battery pack mounting portions, the capacitor assembly is charged, and the MOS transistor is turned on, so that the battery packs provide power to the control assembly, and when the state parameters of the battery packs do not meet the preset condition, the control assembly controls the MOS transistor to open, so that the self-locking control assembly is open, to enable the control assembly to enter a static low power consumption mode.

According to another aspect of the present invention, a power supply method for an electric tool is provided, the electric tool comprise battery pack mounting portions, at least two battery packs being detachably mounted in the battery pack mounting portions, a main switch, being in an open state or a closed state according to an operation of a user, the method comprising the following steps: determining a state of a main switch; and controlling, when the main switch is in an open state, transfer of electric energy of a battery pack with a high voltage to a battery pack with a low voltage of at least two battery packs.

In one embodiment, the electric tool further comprising a switching switch connected to the battery pack mounting portions, the control assembly controls the switching switch to switch between a first state and a second state, wherein the step of controlling, when the main switch is in an open state, transfer of electric energy of a battery pack with a high voltage to a battery pack with a low voltage of at least two battery packs further comprises: controlling, when the main switch is in an open state, a switching switch to switch to a first state, so that the at least two battery packs are connected in parallel to enable a battery pack with a high voltage to charge a battery pack with a low voltage.

In one embodiment, further comprising the following step: controlling, when the main switch is a closed state, the switching switch to switch to a second state, so that the at least two battery packs are connected in series to supply power to a motor.

In one embodiment, the electric tool further comprising a balancing transformer and a balancing switch, the balancing transformer is a multi-winding same-core transformer, the at least two battery packs are separately connected to a winding of the same-core transformer through two balancing switches, wherein the step of controlling, when the main switch is in an open state, transfer of electric energy of a battery pack with a high voltage to a battery pack with a low voltage of at least two battery packs further comprises: controlling, when the main switch is in an open state, two balancing switch connected to the low-voltage battery pack to close, so that the at least two battery packs are connected in series to enable a battery pack with a high voltage to charge a battery pack with a low voltage through a balancing transformer.

In one embodiment, further comprising the following step: controlling, when the main switch is in a closed state, two balancing switch connected to the low-voltage battery pack to close, so that the at least two battery packs are connected in series to enable a battery pack with a high voltage to charge a battery pack with a low voltage through the balancing transformer.

In one embodiment, before the step of the controlling, by a control assembly when the main switch is open, transfer of electric energy of a battery pack with a high voltage to a battery pack with a low voltage of at least two battery packs, further comprising the following steps: obtaining state parameters of the battery packs; determining, according to the state parameters of the battery packs, whether the battery packs meet a preset condition; and controlling, by the control assembly when the parameters of the battery packs meet the preset condition, transfer of electric energy of a battery pack with a high voltage to a battery pack with a low voltage of the at least two battery packs.

In one embodiment, further comprising the following step: controlling, by the control assembly when the battery packs do not meet the preset condition, the at least two battery packs to be connected in series to each other or to be not electrically connected.

In one embodiment, wherein the step of controlling, when the main switch is open, a switching switch to switch to a first state, so that the at least two battery packs are connected in parallel to enable a battery pack with a high voltage to charge a battery pack with a low voltage further comprises: controlling, by a control assembly when the main switch is open, the at least two switching switches to switch to the first state, so that the at least two battery packs are connected in parallel to enable a battery pack with a high voltage to charge a battery pack with a low voltage by using a preset charging current.

In one embodiment, wherein a preset condition comprises at least one of the following: determining, based on state parameters, that temperatures of the battery packs are within a first temperature interval in which mutual charging can be performed; or determining, based on state parameters, that a voltage difference between the battery packs is within a first voltage difference interval in which mutual charging can be performed.

In one embodiment, further comprising: performing, after the step of controlling, by the control assembly when the parameters of the battery packs meet the preset condition, transfer of electric energy of a battery pack with a high voltage to a battery pack with a low voltage of the at least two battery packs, the following steps: obtaining charging state parameters of the battery packs in a current charging state; and determining, according to the charging state parameters of the battery packs, whether the battery packs meet a mutual charging end condition; and controlling, when the battery packs meet the mutual charging end condition, the switching switch to be in a second state, so that the at least two battery packs are connected in series to supply power to the motor.

In one embodiment, wherein the mutual charging end condition comprises at least one of the following: determining, based on the charging state parameters, that temperatures of the battery packs are not in a first temperature interval in which mutual charging can be performed; determining, based on the charging state parameters, that a voltage difference between the battery packs is within a voltage threshold of power balancing between the battery packs; or determining, based on the charging state parameters, that a single battery voltage in the battery packs is not in a safe voltage interval.

In one embodiment, further comprising: performing, after the step of determining, according to the charging state parameters of the battery packs, whether the battery packs meet a mutual charging end condition, the following step: controlling, when the battery packs meet the mutual charging end condition, the control assembly to enter a static low power consumption mode. The electric tool and the power supply method for an electric tool disclosed in the present invention include at least two battery packs, so that when a main switch is open, the at least two battery packs can be controlled to perform voltage balancing to enable electric energy of a battery pack with a high voltage to be transferred to a battery pack with a low voltage, so as to implement active balancing of charging and discharging of the battery packs, thereby extending a total work time and improving power supply efficiency.

According to the following detailed descriptions of exemplary embodiments with reference to the accompanying drawings, other features and aspects of the present disclosure will become clear.

BRIEF DESCRIPTION OF THE DRAWINGS

The accompanying drawings included in the specification and constituting a part of the specification jointly show the exemplary embodiments, characteristics, and aspects of the present disclosure, and are intended to explain the principles of the present disclosure.

FIG. 3a and FIG. 3b are schematic diagrams of a circuit of an electric tool according to an embodiment disclosed in the present invention.

FIG. 4 is a schematic diagram of a circuit of an electric tool according to an embodiment disclosed in the present invention.

FIG. 5 is a schematic diagram of a circuit of an electric tool according to an embodiment disclosed in the present invention.

FIG. 6a and FIG. 6b are schematic diagrams of a circuit of an electric tool according to an embodiment disclosed in the present invention.

DETAILED DESCRIPTION

For ease of understanding of the present invention, the present invention is thoroughly described with reference to the related accompanying drawings. Preferred embodiments of the present invention are provided in the accompanying drawings. However, the present invention may be implemented in many different forms, but is not limited to the embodiments described in this specification. On the contrary, the embodiments are provided for more thorough understanding of the disclosed content of the present invention.

The following will describe various exemplary embodiments, features, and aspects of the present disclosure in detail with reference to the accompanying drawings. Like accompanying symbols in the accompanying drawings represent elements with like or similar functions. Although various aspects of the embodiments are described in the accompanying drawings, the accompanying drawings are not necessarily drawn in proportion unless otherwise specified.

The specific term "exemplary" herein means "used as an example, an embodiment or a description". Any embodiment described as "exemplary" is not necessarily explained as being superior or better than other embodiments.

In addition, for better description of the present disclosure, various specific details are given in the following specific implementations. A person of ordinary skill in the art should understand that the present disclosure may be implemented without some specific details. In some embodiments, methods, means, components, and circuits well known to a person skilled in the art are not described in detail, so that a main purpose of the present disclosure is highlighted.

Embodiment 1

Figure 1:
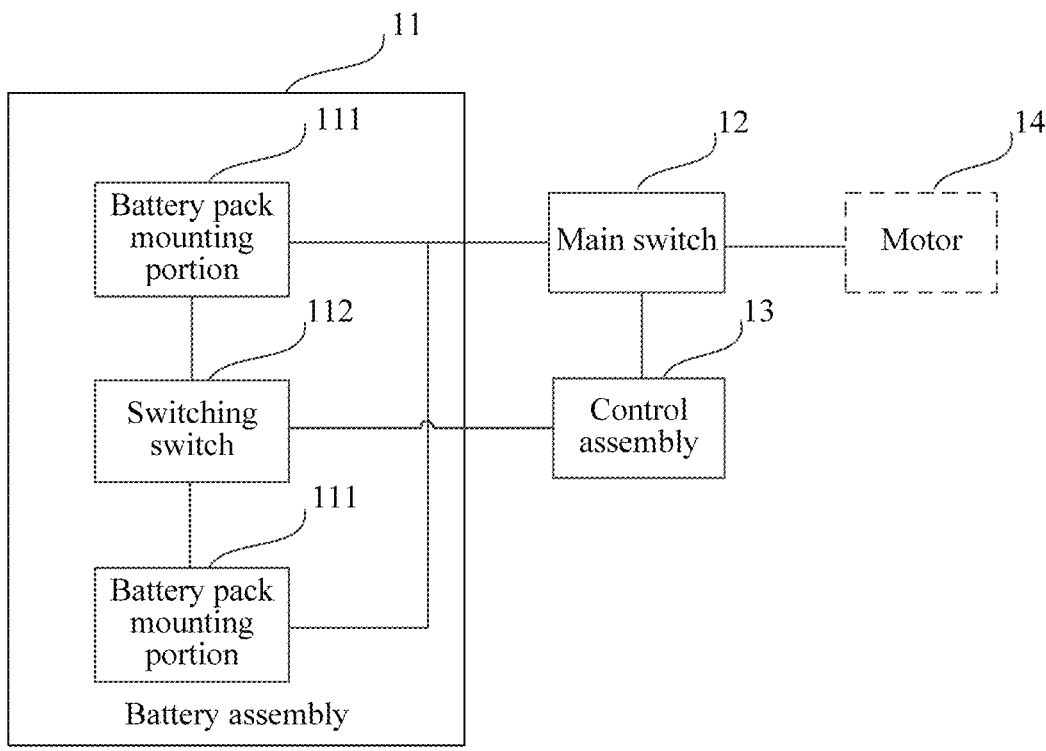
FIG. 1 is a structural block diagram of an electric tool according to an embodiment disclosed in the present invention.

FIG. 1 is a structural block diagram of an electric tool according to an embodiment disclosed in the present invention. As shown in FIG. 1, the electric tool includes a housing, a motor 14 accommodated in the housing, a battery assembly 11, a main switch 12, and a control assembly 13.

The battery assembly 11 includes battery pack mounting portions 111, configured to detachably mount a battery pack, where each battery pack includes a battery pack housing and a plurality of cells disposed in the battery pack housing; and a switching switch 112, located between the battery pack mounting portions 111, and connected to the battery pack mounting portions 111.

The main switch 12 is opened or closed according to an operation of a user. When the main switch 12 is in a closed state, the battery packs may supply power to the motor 14. When the main switch 12 is in an open state, the battery packs stop supplying power to the motor 14.

The control assembly 13 is connected to the main switch 12 and the switching switch 112.

Figure 2:
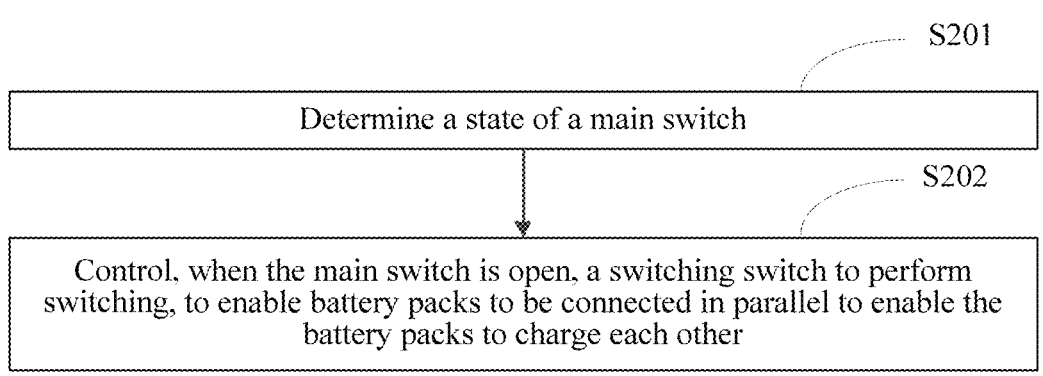
FIG. 2 is a flowchart of a configuration of a control assembly of an electric tool according to an embodiment disclosed in the present invention.

FIG. 2 is a flowchart of a configuration of a control assembly of an electric tool according to an embodiment of the present disclosure. As shown in FIG. 2, the control assembly is configured to perform the following steps.

Step S201: Determine a state of a main switch.

Step S202: Control, when the main switch is open, a switching switch to perform switching, to enable battery packs to be connected in parallel to enable the battery packs to charge each other.

According to an embodiment of the present disclosure, the switching switch can be controlled to switch to a first state when the main switch is open, so that a plurality of battery packs are connected in parallel to enable a battery pack with a high voltage to charge a battery pack with a low voltage to implement power balancing of the plurality of battery packs, thereby extending a total work time and improving power supply efficiency.

For example, in a plurality of battery pack mounting portions 111 of the battery assembly 11, the plurality of battery packs (for example, lithium battery packs of 20 V) can be detachably mounted. The plurality of battery pack mounting portions 111 may include, for example, a plurality of mounting positions. A user may separately insert the battery packs into the mounting positions, so that the plurality of battery packs are connected to the electric tool. The switching switch 112 may be located between the mounting positions of the battery pack mounting portions 111 and connected to the battery pack mounting portions 111. The switching switch 112 is switched between a first state and a second state to change a connection state of the plurality of battery packs, so that the plurality of battery packs are switched among a series connection state, a parallel connection state or a non-electrical connection state. It should be understood that a quantity of battery packs that can be mounted in the battery pack mounting portions 111 may be determined according to actual use of the electric tool. A specific quantity of battery packs that can be mounted is not limited in the present disclosure.

Figure 10:
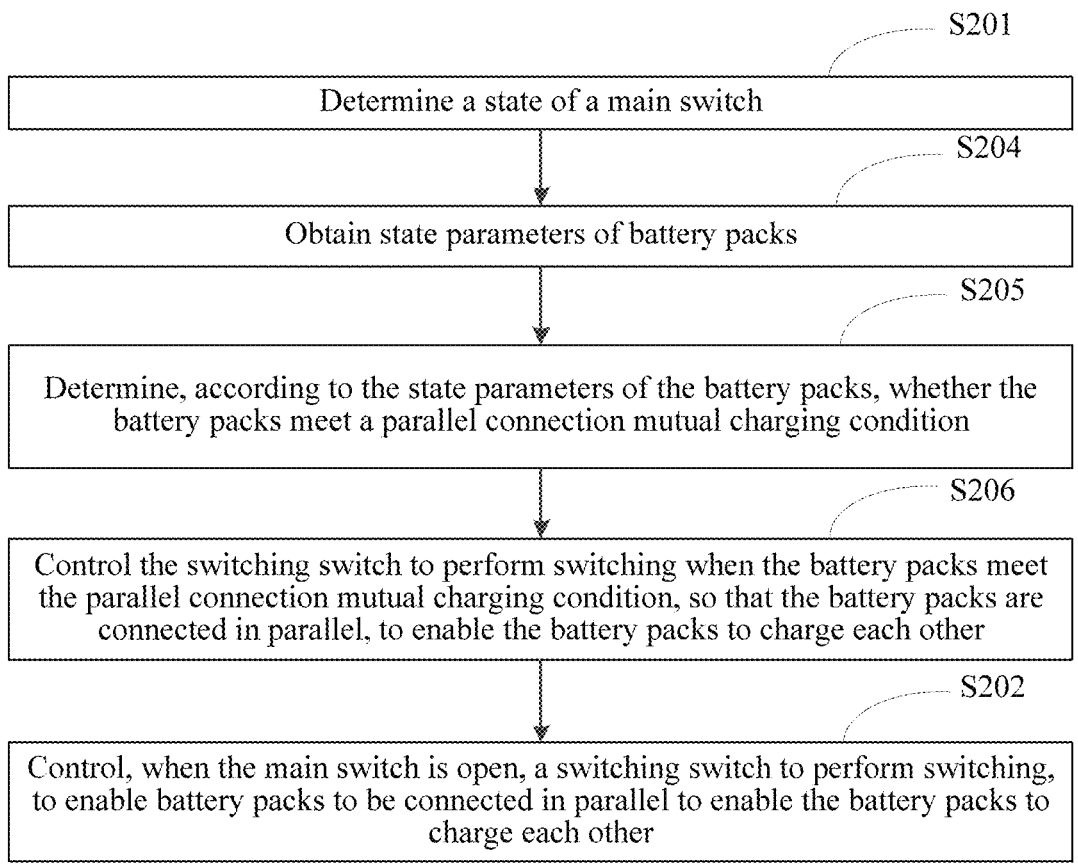
FIG. 10 is a flowchart of a configuration of a control assembly of an electric tool according to an embodiment disclosed in the present invention.

FIG. 10 is a block diagram of an electric tool according to an embodiment of the present disclosure. In a possible implementation, the main switch 12 may include a main circuit switch 121. The main circuit switch 121 is located between the battery assembly 11 and the motor 14, and is configured to electrically disconnect the battery assembly 11 from the motor 14 or electrically connect the battery assembly 11 and the motor 14. The main circuit switch 121 may be opened or closed according to an operation of a user. The main circuit switch 121 may be, for example, a switch button on the electric tool. The motor 14 may be, for example, a brushless electric motor. When the user presses the switch button, the main circuit switch 121 is closed, the battery assembly 11 is connected to the motor 14, and powers of battery packs drive the motor 14 to run (for example, drives the brushless electric motor to rotate), so that the electric tool works. When the user releases the switch button, the main circuit switch 121 is opened, the battery assembly 11 is disconnected from the motor 14, and the motor 14 stops running, to enable the electric tool to stop working.

In a possible implementation, the main switch 12 may further include a bypass switch (not shown). The bypass switch may be used as a power-on switch of the control assembly 13. During actual application, for the types of electric tool products (for example, an electric drill or a chain saw) that may pose a hazard to an operator, the main circuit switch 121 (for example, a mechanical switch) is usually provided on a main circuit, so that the operator releases the main circuit switch 121 when an emergency occurs. As a result, the electric motor is powered off and stops. However, for the types of products (for example, a blowing and sucking apparatus or an electric wrench) that pose no hazard or a slight hazard to an operator, the bypass switch may be included. A specific type of the main switch is not limited in the present disclosure.

In a possible implementation, the control assembly 13 may be connected to the main circuit switch 121 and the switching switch 112. The control assembly 13 may be any processing member, for example, a single-chip microcomputer, a central processing unit (CPU), a microprocessor unit (MPU) or a field programmable gate array (FPGA) that can perform data processing. The control assembly 13 may be implemented by an application-specific hardware circuit or may be implemented by a general-purpose processing member in combination with executable logical instructions, to perform a processing process of the control assembly 13. In a possible implementation, the control assembly 13 may further include a storage module (not shown) to store configuration information of the control assembly 13.

In a possible implementation, the control assembly 13 may determine a state of the main switch 12 in step S201. If the main switch 12 is open, the control assembly 13 may control, in step S202, the switching switch 112 to switch to a state in which the plurality of battery packs are connected in parallel, so that the plurality of battery packs charge each other.

FIG. 3a and FIG. 3b are schematic diagrams of a circuit in which battery packs of an electric tool are connected in parallel according to an embodiment of the present disclosure. As shown in FIG. 3a, the plurality of battery packs may be two battery packs 15. If the main switch 12 is open, the control assembly 13 may control contacts of two switching switches 112 to be separately switched to a position 1, so that a system circuit is equivalent to the circuit shown in FIG. 3b. That is, the plurality of battery packs are connected in parallel to enable a battery pack with a high voltage to charge a battery pack with a low voltage. In this manner, the plurality of battery packs may be controlled to charge each other when the electric tool does not work, and the powers of the battery packs are balanced, thereby extending a total work time and improving power supply efficiency.

In a possible implementation, an electric tool charging system further includes a switching switch 112. The switching switch 112 includes at least one semiconductor switch. The semiconductor switch includes at least one of a relay or a metal oxide semiconductor (MOS) transistor. As shown in FIG. 3a and FIG. 3b, the switching switch 112 is connected between positive electrodes of the two battery packs 15, and the switching switch 112 is connected between negative electrodes of the two battery packs 15. When the main switch 12 is open, the control assembly 13 may control the switching switch 112 to be in a first state, that is, control a contact of the relay to switch to the position 1. The two battery packs 15 are connected in parallel to enable a battery pack with a high voltage to charge a battery pack with a low voltage. When the main switch 12 is closed, the control assembly 13 controls the contact of the relay to switch to a position 2. The two battery packs 15 are connected in series and supply power to the motor 14.

FIG. 4 is a schematic diagram of a circuit of an electric tool according to an embodiment disclosed in the present invention. Battery packs include a first battery pack 151 and a second battery pack 152. The electric tool includes two switching switches 112, a bidirectional power supply 18, a main switch 12, and a motor 14. The bidirectional power supply 18 includes a first input terminal, a second input terminal, a first output terminal, and a second output terminal. The first input terminal is electrically connected to a positive electrode of the first battery pack 151 through the switching switch 112, the first output terminal is electrically connected to a negative electrode of the first battery pack 151, the second input terminal is electrically connected to a positive electrode of the second battery pack 152, and the second output terminal is connected to a negative electrode of the second battery pack 152 through the switching switch 112. When the main switch 12 is open, the control assembly 13 controls the two switching switches 112 to be separately in a first state. That is, the control assembly 13 controls contacts of the two switching switches 112 to switch to the position 1. The two battery packs are connected in parallel. In this case, if there is a voltage difference between the two battery packs, the bidirectional power supply 18 controls a battery pack with a high voltage to charge a battery pack with a low voltage by using a preset charging current. When the main switch 12 is closed, the control assembly 13 controls the two switching switches to be separately in the second state. That is, the control assembly 13 controls the contacts of the two switching switches 112 to switch to the position 2. In this case, the two battery packs are connected in series and supply power to the motor 14. The bidirectional power supply 18 is disposed between the two battery packs 15, so that when the two battery packs 15 with different voltage are controlled to be connected in parallel and charged, the two battery packs 15 are charged according to the preset charging current. In this way, the power of the two battery packs may be balanced, and a total work time is extended. Further, the charging current is prevented to be excessively large, so that the battery packs 15 are protected from damage.

FIG. 5 is a schematic diagram of a circuit of an electric tool according to an embodiment disclosed in the present invention. In this embodiment, the electric tool includes at least two battery packs 15, a main switch 12, a control assembly 13, a motor 14, a balancing transformer 21, and a balancing switch 1122. The balancing transformer 21 is a multi-winding same-core transformer. The at least two battery packs 15 are separately connected to one winding of the same-core transformer through two balancing switches 1122. For example, a positive electrode terminal and a negative electrode terminal of a battery pack are separately connected to one winding of the balancing transformer 21 through two balancing switches 1122, and a positive electrode terminal and a negative electrode terminal of the other battery pack are also separately connected to another winding of the balancing transformer 21 through two balancing switches 1121. The control assembly 13 controls the balancing switches 1121, 1122 to close or open. It is implemented that electric energy of a battery pack with a high voltage is transferred to a battery pack with a low voltage.

Specifically, the battery packs include a first battery pack 151 and a second battery pack 152. When the voltage of the first battery pack 151 is greater than the voltage of the second battery pack 152, the control assembly 13 controls the two balancing switches 1122 connected to the second battery pack 152 to close, and the voltage of the first battery pack 151 charges the second battery pack 152 through the balancing transformer 21. The charging current may be preset in the balancing transformer 21. During charging, the first battery pack 151 charges the second battery pack 152 according to a preset charging current, and stops charging until the voltage of the two battery packs is balanced.

In the foregoing embodiment, when the voltage of the second battery pack 152 is greater than the voltage of the first battery pack 151, the control assembly 13 controls the two balancing switches 1121 connected to the first battery pack 151 to close, and the voltage of the second battery pack 152 charges the first battery pack 151 through the balancing transformer 21. In this embodiment, the two battery packs are connected in series regardless of whether the main switch 12 is closed. Voltage balancing is performed through the balancing transformer 21, so that the power of the two battery packs may be balanced at any time, to avoid that when the two battery packs with a voltage difference are used for a long time, the use of the tool is affected and the use time is shortened when the power of a battery pack with a low voltage is excessively low.

In the foregoing embodiment, the balancing switches 1122 includes one of a relay or a MOS transistor.

FIG. 6a is a schematic diagram of a circuit of an electric tool according to an embodiment disclosed in the present invention. Battery packs include a first battery pack 151 and a second battery pack 152. A main switch 12 includes a single-pole multi-throw switch formed by three switches linked together. The three linked switches are a first switch K1, a second switch K2, and a third switch K3. The first switch K1 is electrically connected to a negative electrode of the first battery pack 151 and the motor 14. The second switch K2 and the third switch K3 are single-pole two-throw switches and are separately located between the first battery pack 151 and the second battery pack 152. The first switch K1 is in an open state or a closed state according to an operation of a user. When the first switch K1 is in an open state, the first switch K1 is linked to enable the second switch and the third switch to be separately located in the position 1. The first battery pack 151 and the second battery pack 152 are connected in parallel. Electric energy of a battery pack with a high voltage is transferred to a battery pack with a low voltage.

FIG. 6b is a schematic diagram of a circuit of an electric tool according to an embodiment disclosed in the present invention. In FIG. 6b, a fourth switch 18 is added based on FIG. 6a. The fourth switch 18 is located between the second switch K2 and the first battery pack 151 of the single-pole multi-throw switch. That is, one end of the fourth switch 18 is connected to the second switch K2 of the single-pole multi-throw switch, and the other end is connected to the first switch of the single-pole multi-throw switch and negative electrodes of battery packs. When the first switch K1 is in an open state, the first switch K1 is linked, to enable the second switch and the third switch to be located in the position 1. The control assembly controls the fourth switch 18 according to parameters of the battery packs to close or open. When the fourth switch 18 is closed, the first battery pack 151 and the second battery pack 152 are connected in parallel, and electric energy of a battery pack with a high voltage is transferred to a battery pack with a low voltage.

Figure 7:
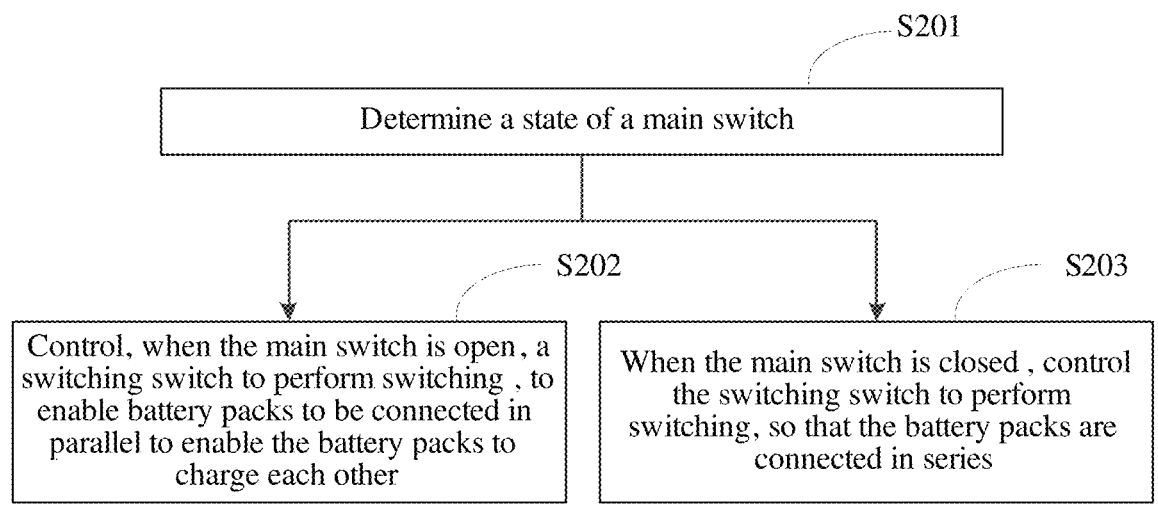
FIG. 7 is a flowchart of a configuration of a control assembly of an electric tool according to an embodiment disclosed in the present invention.
Figure 8A:
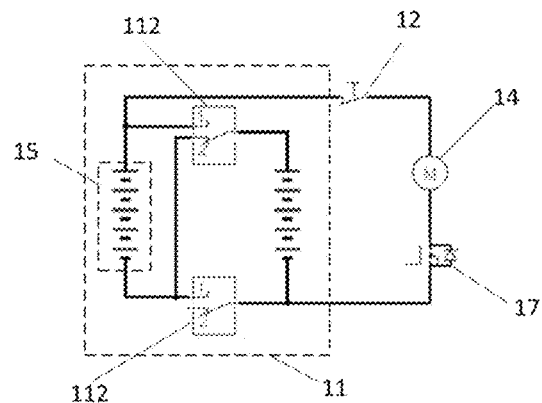
FIG. 8a and FIG. 8b are schematic diagrams of a circuit of an electric tool according to an embodiment disclosed in the present invention.
Figure 8B:
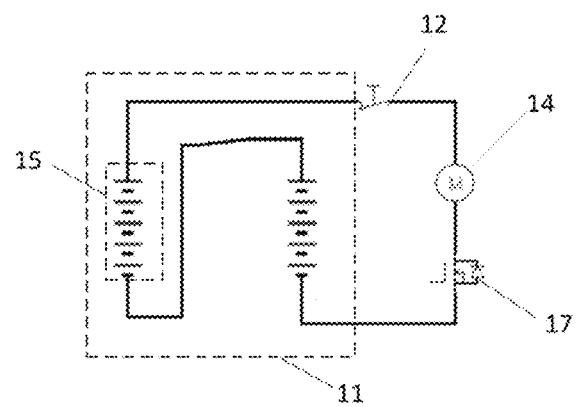

FIG. 7 is a flowchart of a configuration of a control assembly of an electric tool according to an embodiment of the present disclosure. FIG. 8a and FIG. 8b are schematic diagrams of a circuit in which battery packs of an electric tool are connected in parallel according to an embodiment of the present disclosure.

As shown in FIG. 7, in a possible implementation, the control assembly is further configured to perform the following steps.

Step S203: When the main switch is closed, control the switching switch to perform switching, so that the battery packs are connected in series.

For example, if the control assembly 13 determines that the main switch 12 is closed in step S201, the control assembly 13 may control the switching switch 112 to switch to the second state in step S203, so that the plurality of battery packs are connected in series to supply power to the motor. As shown in FIG. 8a, the plurality of battery packs may be two battery packs 15. If the main switch 12 is closed, the control assembly 13 may control contacts of the two switching switches 112 to separately switch to a position 2, so that a system circuit is equivalent to the circuit shown in FIG. 8b. That is, the plurality of battery packs are connected in series to each other. In this manner, when the user presses the switch button (the main switch 12 is closed), the plurality of battery packs 15 are controlled to be connected in series to supply power to the motor 14, thereby improving a power output when the electric tool works.

As shown in FIG. 5, if the main switch 12 is closed, the control assembly 13 may control the two switching switches 1121 and 1122 to open, and the plurality of battery packs are connected in series to each other. In this manner, when the user presses the switch button (the main switch 12 is closed), the plurality of battery packs 15 are controlled to be connected in series to supply power to the motor 14, thereby improving a power output when the electric tool works.

Figure 9:
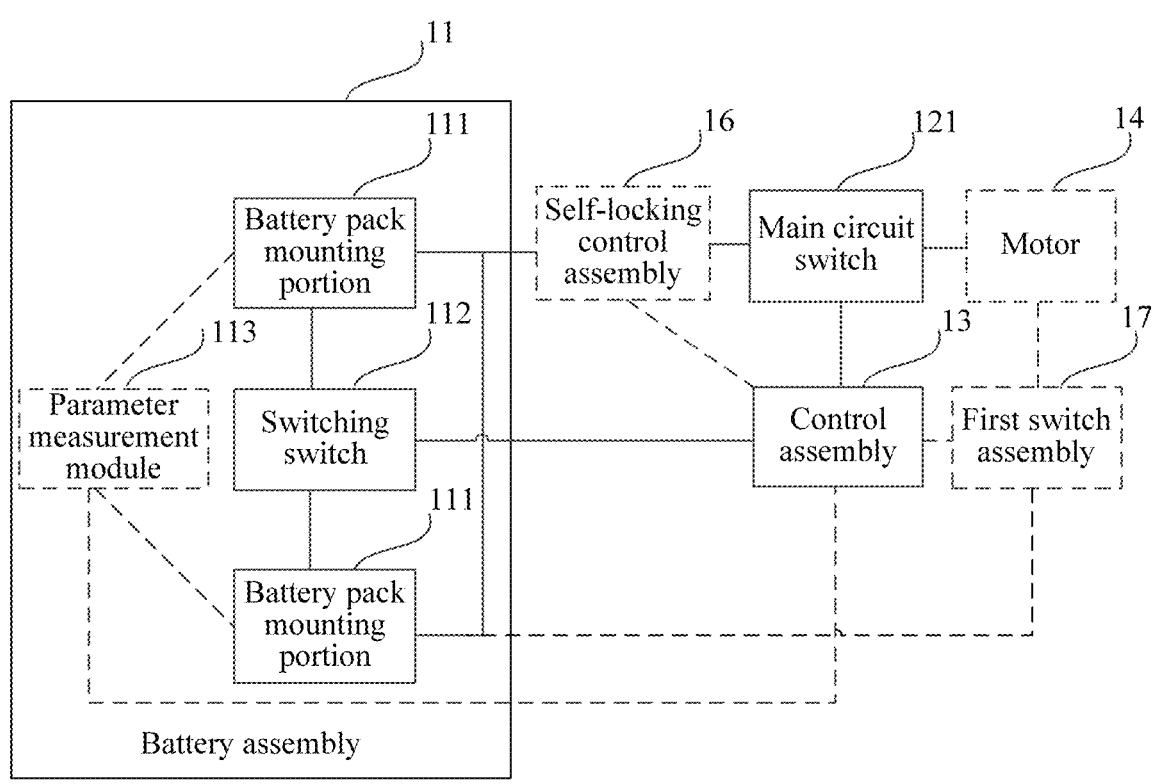
FIG. 9 is a structural block diagram of an electric tool according to an embodiment disclosed in the present invention.

In a possible implementation, as shown in FIG. 9, the battery assembly 11 further includes a parameter measurement module 113. The parameter measurement module 113 may be connected to the battery pack mounting portions 111, and is configured to obtain state parameters of the battery packs. The control assembly 13 is connected to the parameter measurement module 113.

FIG. 10 is a flowchart of a configuration of a control assembly of an electric tool according to an embodiment of the present disclosure. In a possible implementation, as shown in FIG. 10, the control assembly 13 is further configured to perform the following steps before step S202.

Step S204: Obtain state parameters of battery packs.

Step S205. Determine, according to the state parameters of the battery packs, whether the battery packs meet a parallel connection mutual charging condition.

Step S206. Control the switching switch to perform switching when the battery packs meet the parallel connection mutual charging condition, so that the battery packs are connected in parallel, to enable the battery packs to charge each other.

For example, the parameter measurement module 113 may be connected to the battery pack mounting portions 111, to obtain the state parameters of the battery packs. The state parameters may include the state parameters, for example, temperatures, voltages, and charging and discharging states, of the plurality of battery packs. It should be understood that the parameter measurement module 113 may use a measurement method known in the art to obtain the state parameters of the battery packs. This is not limited in the present disclosure.

In a possible implementation, the control assembly 13 may be connected to the parameter measurement module 113, to obtain in real time the state parameters, measured by the parameter measurement module 113, of the battery packs in step S204. The control assembly 13 may determine whether the plurality of battery packs meet the parallel connection mutual charging condition in step S205 according to the state parameters.

In a possible implementation, as shown in FIG. 3a, when the control assembly 13 determines that the main switch 12 is open, the parameter measurement module 113 obtains the state parameters of the two battery packs 15, and the control assembly 13 determines whether the state parameters of the two battery packs 15 meet the parallel connection mutual charging condition, for example, whether at least one of a temperature or a voltage meets a preset condition. If the preset condition is met, the control assembly 13 controls the contact of the switching switch 112 to switch to the position 1, and the two battery packs are connected in parallel to enable a battery pack with a high voltage to charge a battery pack with a low voltage. In this embodiment, the two battery packs are connected in parallel to charge each other when the two battery packs do not work. Therefore, the power of the two battery packs is balanced, and it is prevented that when a battery pack with a low power is connected in series to a battery pack with a high power to work, the tool cannot be used if a battery pack with a low power meets a discharging stop condition, thereby extending the use time of the tool and improving power supply efficiency. In addition, the state parameters of the two battery packs are determined before charging, and it is determined according to the state parameters of the battery packs whether to perform mutual charging, to prevent a condition in which parallel connection mutual charging affects the service life of the battery packs when the battery packs are overheated or over-discharged or has a relatively large voltage difference.

In a possible implementation, as shown in FIG. 4, when the control assembly 13 determines that the main switch 12 is open, the parameter measurement module 113 obtains the state parameters of the two battery packs 15, and the control assembly 13 determines whether the state parameters of the two battery packs 15 meet the parallel connection mutual charging condition, for example, whether at least one of a temperature or a voltage meets the preset condition. If the preset condition is met, the control assembly 13 controls the contact of the switching switch 112 to switch to the position 1, and the control assembly 13 controls the bidirectional power supply 18 to enable a battery pack with a low voltage to charge a battery pack with a high voltage according to a preset charging current. In this embodiment, based on the foregoing embodiment, the charging current used by a battery pack with a high voltage to charge a battery pack with a low voltage is controlled to implement stable charging, to prevent the service life of the battery packs from being affected when the temperature increases excessively fast during charging to meet a charging stop condition.

In a possible implementation, as shown in FIG. 5, the parameter measurement module 113 obtains the state parameters of the two battery packs 15, and the control assembly 13 determines whether the state parameters of the two battery packs 15 meet a mutual charging condition, for example, whether the temperature meets a preset range. If the preset range is met, the control assembly 13 controls the balancing switch 1122 to close, and a battery pack with a high voltage charges a battery pack with a low voltage according to a charging current preset in the balancing transformer 21 In this embodiment, the two battery packs 15 are controlled to be connected in series to charge each other through the balancing transformer 21, so that the two battery packs 15 may perform power balancing at any time, to extend the use time of the electric tool. The parameters of the battery packs 15 are detected through the parameter measurement module 113, and it is determined according to the parameters whether to perform mutual charging, to better protect the battery packs 15 and prevent the battery packs 15 from charging each other when the temperature is excessively high, thereby protecting the service life of the battery packs 15 from being affected.

In a possible implementation, as shown in FIG. 6b, when the control assembly 13 determines that the main switch 12 is open, the parameter measurement module 113 obtains the state parameters of the two battery packs 15, and the control assembly 13 determines whether the state parameters of the two battery packs 15 meet the parallel connection mutual charging condition. If the parallel connection mutual charging condition is met, the control assembly 13 controls the fourth switch 18 to close, and the two battery packs are connected in parallel to enable a battery pack with a high voltage to charge a battery pack with a low voltage. In this embodiment, the parameters of the battery packs 15 are detected through the parameter measurement module 113, and it is determined according to the parameters whether to perform mutual charging, to better protect the battery packs 15 and prevent the battery packs 15 from charging each other when the temperature is excessively high, thereby protecting the service life of the battery packs 15 from being affected.

In a possible implementation, in the circuit shown in FIG. 5, the condition in which the two battery packs are connected in series to charge each other includes determining, based on the state parameters, that temperatures of the battery packs are within a first temperature interval in which mutual charging can be performed. For example, when a temperature of any battery pack is greater than a preset temperature (for example, 45° C.), the control assembly 13 controls the balancing switch 1122 between the two battery packs to open, and the two battery packs 15 do not charge each other. When the temperature of any battery pack is less than a preset temperature (for example, 0° C.), the control assembly 13 controls the balancing switch 1122 between the two battery packs to open, and the two battery packs 15 do not charge each other. When the temperatures of both the battery packs are within a preset range (for example, 0° C. to 45° C.), the control assembly 13 controls the two battery packs 15 to perform charging according to a preset charging current.

In a possible implementation, the two battery packs are connected in parallel, and the meeting the mutual charging condition includes at least one of the following:

determining, based on the state parameters, that temperatures of the battery packs are within a first temperature interval in which mutual charging can be performed; or determining, based on the state parameters, that a voltage difference between the battery packs is within a first voltage difference interval in which mutual charging can be performed.

For example, when the temperatures of the battery packs are greater than a particular temperature (for example, 45° C.) or less than a particular temperature (for example, 0° C.), that a hazard may be caused when the battery packs are connected in parallel to charge each other. Therefore, the control assembly 13 may determine, according to battery temperatures in the state parameters of the battery packs, whether the temperatures are within the first temperature interval in which mutual charging can be performed. If the battery temperatures are within the first temperature interval, it may be determined that the plurality of battery packs meet the parallel connection mutual charging condition, and the battery packs may be connected in parallel to charge each other. Otherwise, if the battery temperatures are not in the first temperature interval, it may be determined that the plurality of battery packs do not meet the parallel connection mutual charging condition, and the battery packs cannot be connected in parallel to charge each other. The first temperature interval may be, for example, 0° C. to 45° C. However, it should be understood that the first temperature interval may be set according to actual conditions of the battery packs. Specific values of the first temperature interval are not limited in the present disclosure.

In a possible implementation, when a voltage difference between the plurality of battery packs exceeds a threshold, a hazard may be caused when the battery packs are connected in parallel to charge each other. For example, for a battery pack of 20 V, when a voltage difference between the battery packs is 12 V, if the battery packs are connected in parallel to charge each other, the charging current is large (for example, exceeds 30 A), the battery packs may be irreversibly damaged. Conversely, if the voltage difference between the plurality of battery packs is less than a particular threshold (for example, the voltage difference between the battery packs is 7 V), a power difference between the battery packs is relatively small, and parallel connection mutual charging is not needed.

Therefore, the control assembly 13 may determine, according to battery voltages in the state parameters of the battery packs, whether the voltage difference between the battery packs is within a first voltage difference interval in which mutual charging can be performed. If the voltage difference between the battery packs is within the first voltage difference interval, it may be determined that the plurality of battery packs meet the parallel connection mutual charging condition, and the battery packs may be connected in parallel to charge each other. Otherwise, if the voltage difference between the battery packs is not in the first voltage difference interval, it may be determined that the plurality of battery packs meet the parallel connection mutual charging condition, and the battery packs cannot be connected in parallel to charge each other. The first voltage difference interval may be, for example, 1 V to 12 V. However, it should be understood that the first voltage difference interval may be set according to actual conditions of the battery packs. Specific values of the first voltage difference interval are not limited in the present disclosure.

In a possible implementation, if the main circuit switch 121 is open, and the battery packs meet the parallel connection mutual charging condition, the control assembly 13 may control the switching switch 112 to perform switching in step S206, so that the battery packs are connected in parallel. For example, as shown in FIG. 3a, the control assembly 13 may control contacts of the two switching switches 112 to separately switch to a position 1, so that a system circuit is equivalent to the circuit shown in FIG. 3b. That is, the plurality of battery packs are connected in parallel to charge each other. In this manner, the plurality of battery packs may be controlled to charge each other when the electric tool does not work and the battery packs meet the parallel connection mutual charging condition, and the powers of the battery packs are balanced, thereby extending a total work time and improving power supply efficiency.

Figure 11:
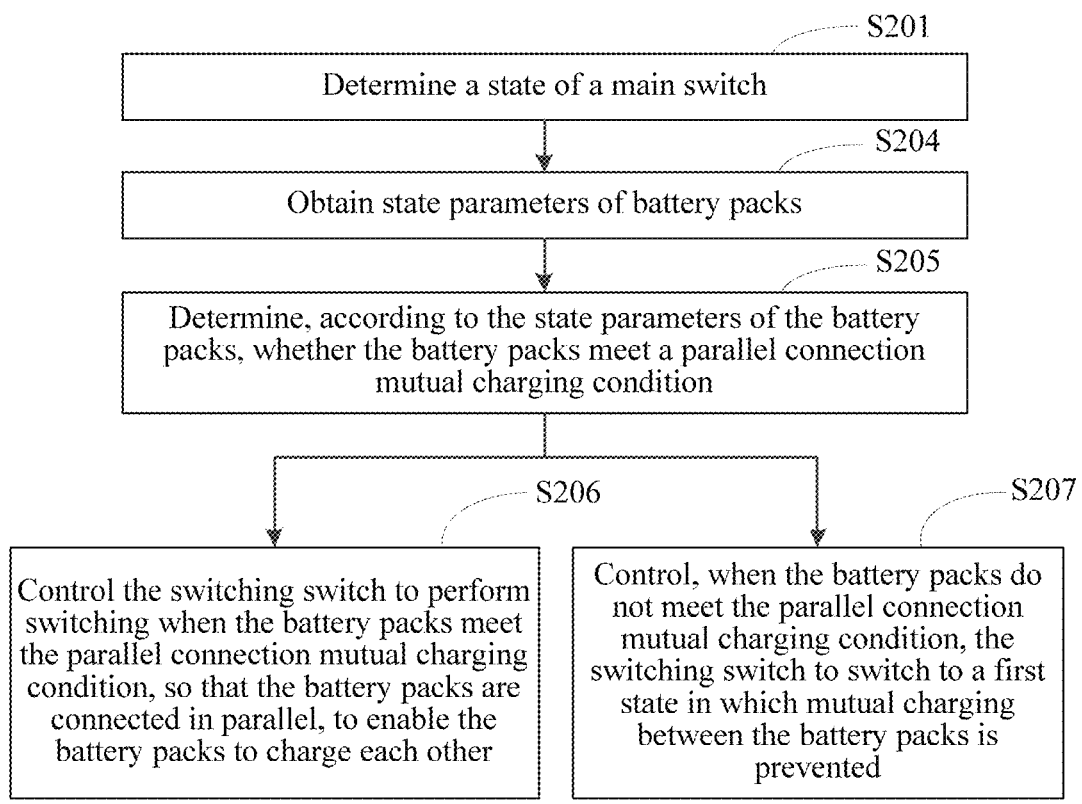
FIG. 11 is a flowchart of a configuration of a control assembly of an electric tool according to an embodiment disclosed in the present invention.

FIG. 11 is a flowchart of a configuration of a control assembly of an electric tool according to an embodiment of the present disclosure. In a possible implementation, as shown in FIG. 11, the control assembly 13 is further configured to perform the following steps after step S205.

Step S207: Control, when the battery packs do not meet the parallel connection mutual charging condition, the switching switch to switch to a first state in which mutual charging between the battery packs is prevented.

In a possible implementation, the first state is one of the following cases: the battery packs are connected in series to each other; or the battery packs are not electrically connected.

For example, if the main circuit switch 121 is open, and the battery packs do not meet the parallel connection mutual charging condition, the control assembly 13 may control the two switching switches to switch to the first state in which mutual charging between the battery packs is prevented in step S207. The first state may be that the battery packs are connected in series to each other or the battery packs are not electrically connected.

In a possible implementation, as shown in FIG. 8a, the control assembly 13 may control the contacts of the two switching switches 112 to separately switch to the position 2, so that the plurality of battery packs are in the first state in which the plurality of battery packs are connected in series to each other.

In a possible implementation, the control assembly 13 may further control the contacts of the two switching switches 112 to separately switch to the position 1 and the position 2 or control the contacts of the two switching switches 112 to be separately suspended or connected to another position, so that the plurality of battery packs are in the first state that the plurality of battery packs are not electrically connected.

In this manner, when the battery packs do not meet the parallel connection mutual charging condition, the battery packs are prevented from charging each other, so that dangers are prevented, and the safety of the system is improved.

Figure 12:
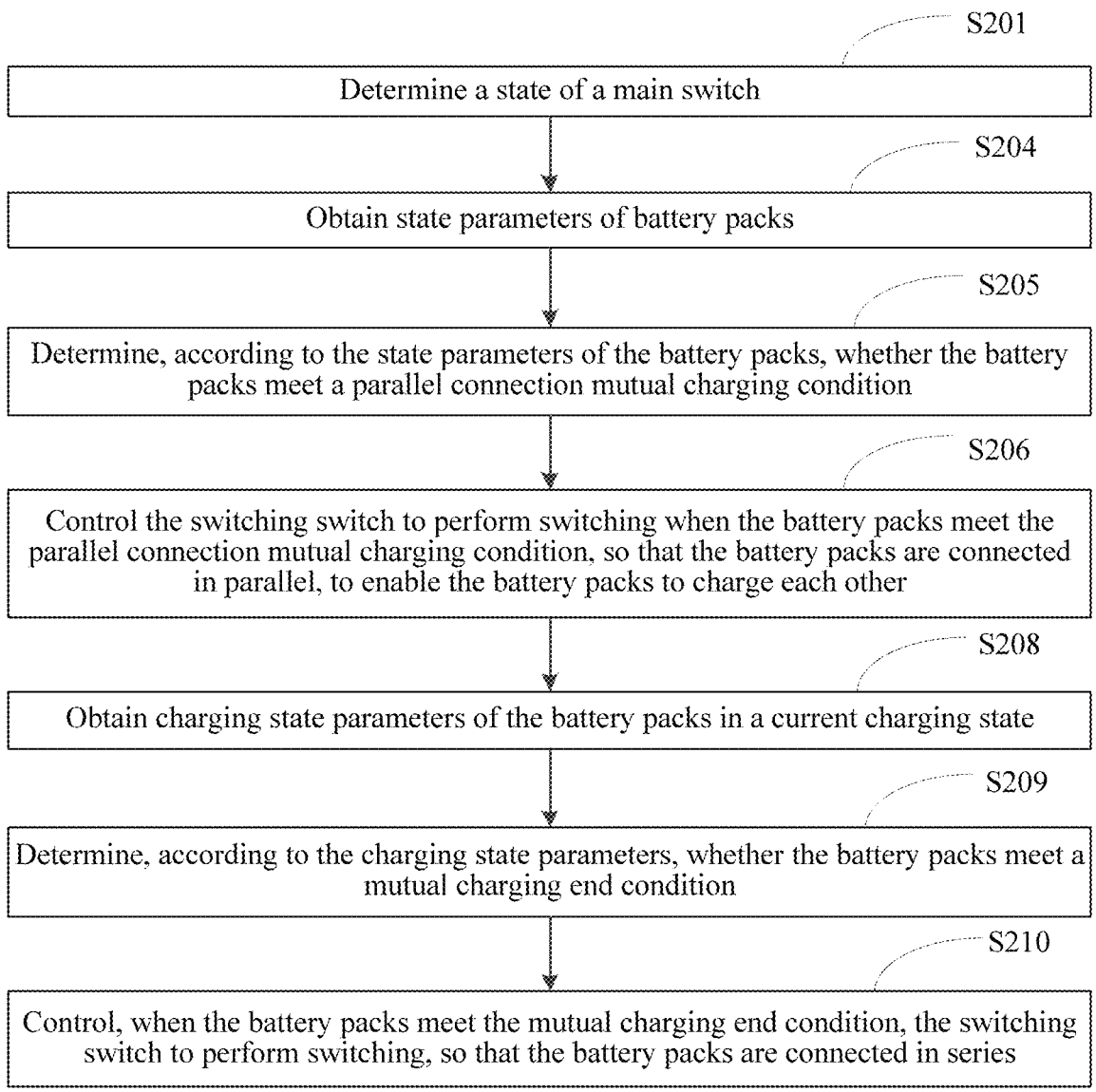
FIG. 12 is a flowchart of a configuration of a control assembly of an electric tool according to an embodiment disclosed in the present invention.

FIG. 12 is a flowchart of a configuration of a control assembly of an electric tool according to an embodiment of the present disclosure. In a possible implementation, as shown in FIG. 11, the control assembly 13 is further configured to perform the following steps after step S206.

Step S208: Obtain charging state parameters of the battery packs in a current charging state.

Step S209: Determine, according to the charging state parameters, whether the battery packs meet a mutual charging end condition.

Step S210: Control, when the battery packs meet the mutual charging end condition, the switching switch to perform switching, so that the battery packs are connected in series.

For example, after the control assembly 13 controls the battery packs to be connected in parallel to charge each other in step S206, the parameter measurement module 113 may measure the charging state parameters of the battery packs in a current charging state. The state parameters may include state parameters, for example, temperatures, voltages, and charging and discharging states, of the plurality of battery packs. In step S208, the control assembly 13 may obtain the charging state parameters measured by the parameter measurement module 113 in real time. The control assembly 13 may determine, according to the charging state parameters, whether the battery packs meet the mutual charging end condition in step S209.

In a possible implementation, the mutual charging end condition includes at least one of the following:
determining, based on the charging state parameters, that temperatures of the battery packs are not in a first temperature interval in which mutual charging can be performed;
determining, based on the charging state parameters, that a voltage difference between the battery packs is within a voltage threshold of power balancing between the battery packs; or
determining, based on the charging state parameters, that a single battery voltage in the battery packs is not in a safe voltage interval.

For example, in a process in which the battery packs are connected in parallel to charge each other, the temperature may change. When the temperatures of the battery packs are greater than a temperature (for example, the temperatures of the discharging battery packs are greater than 75° C. and/or the temperatures of the charging battery packs are greater than 45° C.) or less than a temperature (for example, 0° C.), that a hazard may be caused when the battery packs are connected in parallel to charge each other. Therefore, the control assembly 13 may determine, according to battery temperatures in the charging state parameters of the battery packs, whether the temperatures are within the first temperature interval in which mutual charging can be performed. If the battery temperatures are not in the first temperature interval, it may be determined that the plurality of battery packs meet the mutual charging end condition, and the battery packs cannot continue to be connected in parallel to charge each other. Otherwise, if the battery temperatures are within the first temperature interval, it may be determined that the plurality of battery packs do not meet the mutual charging end condition, and the battery packs can continue to be connected in parallel to charge each other. The first temperature interval may be, for example, 0° C. to 45° C. However, it should be understood that the first temperature interval may be set according to actual conditions of the battery packs. Specific values of the first temperature interval are not limited in the present disclosure.

In a possible implementation, in a process in which the battery packs are connected in parallel to charge each other, the voltages of the battery packs may change. A voltage of a battery pack with a high voltage decreases because of discharging, and a voltage of a battery pack with a low voltage increases because of charging, so that the voltage difference between the battery packs decreases. If the voltage difference between the plurality of battery packs is less than a threshold (for example, the voltage difference between the battery packs is 0.5 V), the voltage difference between the battery packs is relatively small, and parallel connection mutual charging does not need to continue.

Therefore, the control assembly 13 may determine, according to battery voltages in the charging state parameters of the battery packs, whether the voltage difference between the battery packs is within a voltage threshold in which the powers of the battery packs are balanced (that is, the voltage difference is less than or equal to the voltage threshold). If the voltage difference between the battery packs is less than or equal to the voltage threshold, it is determined that the plurality of battery packs meet the mutual charging end condition, and the battery packs cannot be connected in parallel to charge each other. Otherwise, if the voltage difference between the battery packs is greater than the voltage threshold, it may be determined that the plurality of battery packs do not meet the mutual charging end condition, and the battery packs may be connected in parallel to charge each other. The voltage threshold may be, for example, 0.5 V. However, it should be understood that the voltage threshold may be set according to actual conditions of the battery packs. A specific value of the voltage threshold is not limited in the present disclosure.

In a possible implementation, the battery packs may include a plurality of batteries (for example, a plurality of lithium batteries). In a process in which the battery packs are connected in parallel to charge each other, the voltages of the battery packs may change. The voltage of a battery pack with a high voltage decreases because of discharging, and the voltage of a battery pack with a low voltage increases because of charging. However, a single battery voltage in each battery needs to be in a safe voltage range (for example, a range of 2.5 V to 4.2 V). Otherwise, the battery may be over-charged (greater than 4.2 V) or over-discharged (less than 2.5 V), and a hazard may be caused when the battery packs are connected in parallel to charge each other.

Therefore, the control assembly 13 may determine, according to the single battery voltage in the charging state parameters of the battery packs, whether the single battery voltage is within a safe voltage interval. If the single battery voltage is within the safe voltage interval, it may be determined that the plurality of battery packs do not meet the mutual charging end condition, and the battery packs can continue to be connected in parallel to charge each other. Otherwise, if the single battery voltage is not in the safe voltage interval, it may be determined that the plurality of battery packs meet the mutual charging end condition, and the battery packs cannot continue to be connected in parallel to charge each other. For a lithium battery of 3.6 V, the safe voltage interval may be, for example, 2.5 V to 4.2 V. However, it should be understood that the safe voltage interval may be set according to an actual condition of the lithium battery. Specific values of the safe voltage interval are not limited in the present disclosure.

In a possible implementation, if the main circuit switch 121 is open, and the battery packs do not meet the mutual charging end condition, the control assembly 13 may maintain a state in which the battery packs are connected in parallel to charge each other, and continue to obtain the charging state parameters to perform determination (that is, repeating steps S208 and S209).

In a possible implementation, if the main circuit switch 121 is open, and the battery packs meet the mutual charging end condition, the control assembly 13 may control the switching switch to perform switching in step S210, so that the battery packs are connected in series. For example, as shown in FIG. 8a, the control assembly 13 may control contacts of the two switching switches 112 to separately switch to a position 2, so that a system circuit is equivalent to the circuit shown in FIG. 8b. That is, the plurality of battery packs are connected in series.

In this manner, when the electric tool does not work and the mutual charging end condition is met, the plurality of battery packs stop being connected in parallel to perform charging, to prevent mutual charging for a long time.

In a possible implementation, as shown in FIG. 9, the system further includes:
a self-locking control assembly 16, located between the battery assembly and the control assembly, where when the battery packs are mounted in the battery assembly, the self-locking control assembly 16 is turned on, so that the battery assembly supplies power to the control assembly.

In a possible implementation, the self-locking control assembly 16 includes:
a self-locking switch circuit, connected between the battery assembly 11 and a power supply circuit of the control assembly 13, where when the self-locking switch circuit is closed, the battery assembly 11 is connected to the power supply circuit, so that the battery assembly 11 supplies power to the power supply circuit; and
a control circuit, connected between a control signal output terminal of the control assembly 13 and a control signal input terminal of the self-locking switch circuit, and controlling, based on a control signal of the control assembly, the self-locking switch circuit to open or close.

In a possible implementation, one end of the self-locking control assembly 16 is connected to the battery packs 15, and the other end is separately connected to the main switch 12 and the control assembly 13. The self-locking control assembly 16 includes a capacitor assembly and a MOS transistor. A first end of the capacitor assembly is separately connected to the battery packs 15, the main switch, and the MOS transistor. A second end is connected to the control assembly 13. When the battery packs 15 are mounted into the battery pack mounting portions, the capacitor assembly is charged, and the MOS transistor is turned on, so that the control assembly 13 is powered up to work. The control assembly 13 detects whether the main switch 12 is closed. If the main switch 12 is not closed, the control assembly 13 determines whether the state parameters of the battery packs meet a preset condition. When the state parameters of the battery packs 13 meet the preset condition, the control assembly 13 controls the switching switch 112 to switch to the position 1, so that the two battery packs are connected in parallel, and electric energy of a battery pack with a high voltage is transferred to a battery pack with a low voltage. During charging, when the state parameters of the battery packs 13 do not meet the preset condition, the control assembly 13 controls the MOS transistor to be turned on, so that the self-locking control assembly 16 is open, to enable the control assembly 13 to enter a static low power consumption mode.

Figure 13:
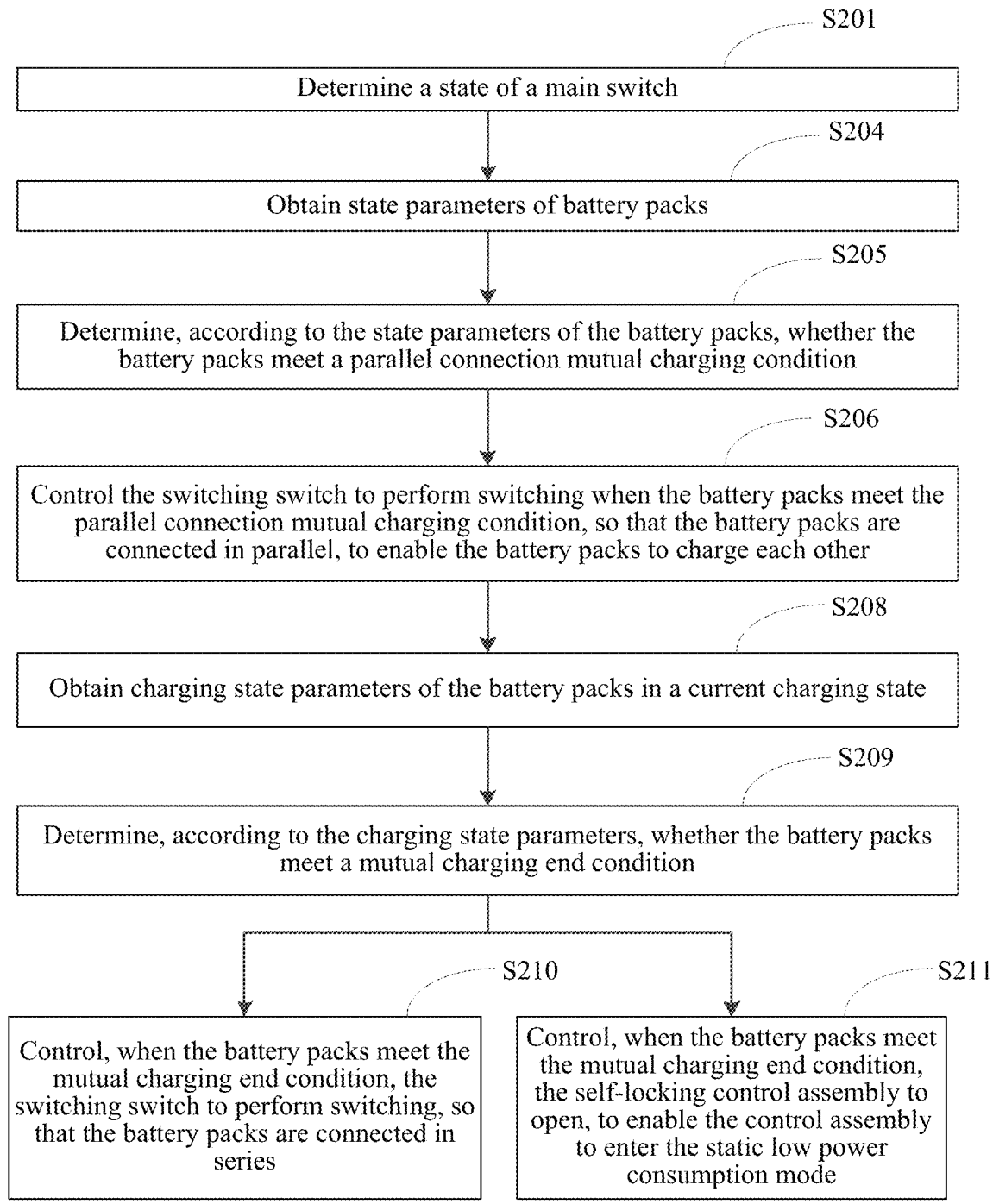
FIG. 13 is a flowchart of a configuration of a control assembly of an electric tool according to an embodiment disclosed in the present invention.

FIG. 13 is a flowchart of a configuration of a control assembly of an electric tool according to an embodiment of the present disclosure. As shown in FIG. 13, in a possible implementation, the control assembly 13 is further configured to perform the following steps after step S209.

Step S211: Control, when the battery packs meet the mutual charging end condition, the self-locking control assembly to open, to enable the control assembly to enter the static low power consumption mode.

For example, the electric tool may further include the self-locking control assembly 16 located between the battery assembly 11 and the control assembly 13. The self-locking control assembly 16 is configured to implement self-locking and kill control of the circuit. The self-locking control assembly 16 may include a self-locking switch circuit and a control circuit.

In a possible implementation, the self-locking switch circuit of the self-locking control assembly 16 is connected between the battery assembly 11 and the power supply circuit of the control assembly 13. When the battery packs are mounted in the battery assembly 11, the self-locking switch circuit is closed, so that the battery assembly 11 to be connected to the power supply circuit of the control assembly 13, to enable the battery assembly 11 to supply power to the power supply circuit. As a result, the control assembly 13 is powered up and turned on, and may implement various functions of the control assembly 13.

In a possible implementation, the control circuit of the self-locking control assembly 16 is connected between a control signal output terminal of the control assembly 13 and a control signal input terminal of the self-locking switch circuit, and controls, based on a control signal of the control assembly, the self-locking switch circuit to open or close. The control assembly 13 may output the control signal through one or more control signal output terminals. In a normal operating (standby or working) process of the electric tool, the self-locking control assembly 16 is locked to be turned on under the control of the control signal of the control assembly (for example, the control signal output terminal of the control assembly outputs a high level to the control signal input terminal of the self-locking switch circuit), which maintains power supply of the control assembly 13, thereby implementing the function of self-locking control.

In a possible implementation, if the control assembly 13 determines that the battery packs meet the mutual charging end condition in step S209, the control assembly 13 may output the control signal to the self-locking control assembly 16 in step S211 (for example, the control signal output terminal of the control assembly outputs a low level to the control signal input terminal of the self-locking switch circuit), and control the self-locking control assembly 16 to open. In this case, the battery assembly 11 is disconnected from the power supply circuit of the control assembly 13, so that no power is supplied to the control assembly 13, and the control assembly 13 enters the static low power consumption mode. In this way, the function of kill control is implemented.

In this manner, when the main circuit switch 121 is open and mutual charging of the battery packs ends, the control assembly 13 enters the static low power consumption mode, to reduce power consumption when the electric tool is in a standby state, thereby improving the power supply efficiency of the electric tool. Meanwhile, the lithium battery is protected from a relatively high standby current, so that the battery is prevented from being completely discharged within a short time. For example, assuming that a battery pack capacity is 2.0 Ah, if a standby current is 10 mA, a standby time is 27 days. If the standby current is as low as 10 uA, the standby time may be 32 years theoretically.

Figure 14:
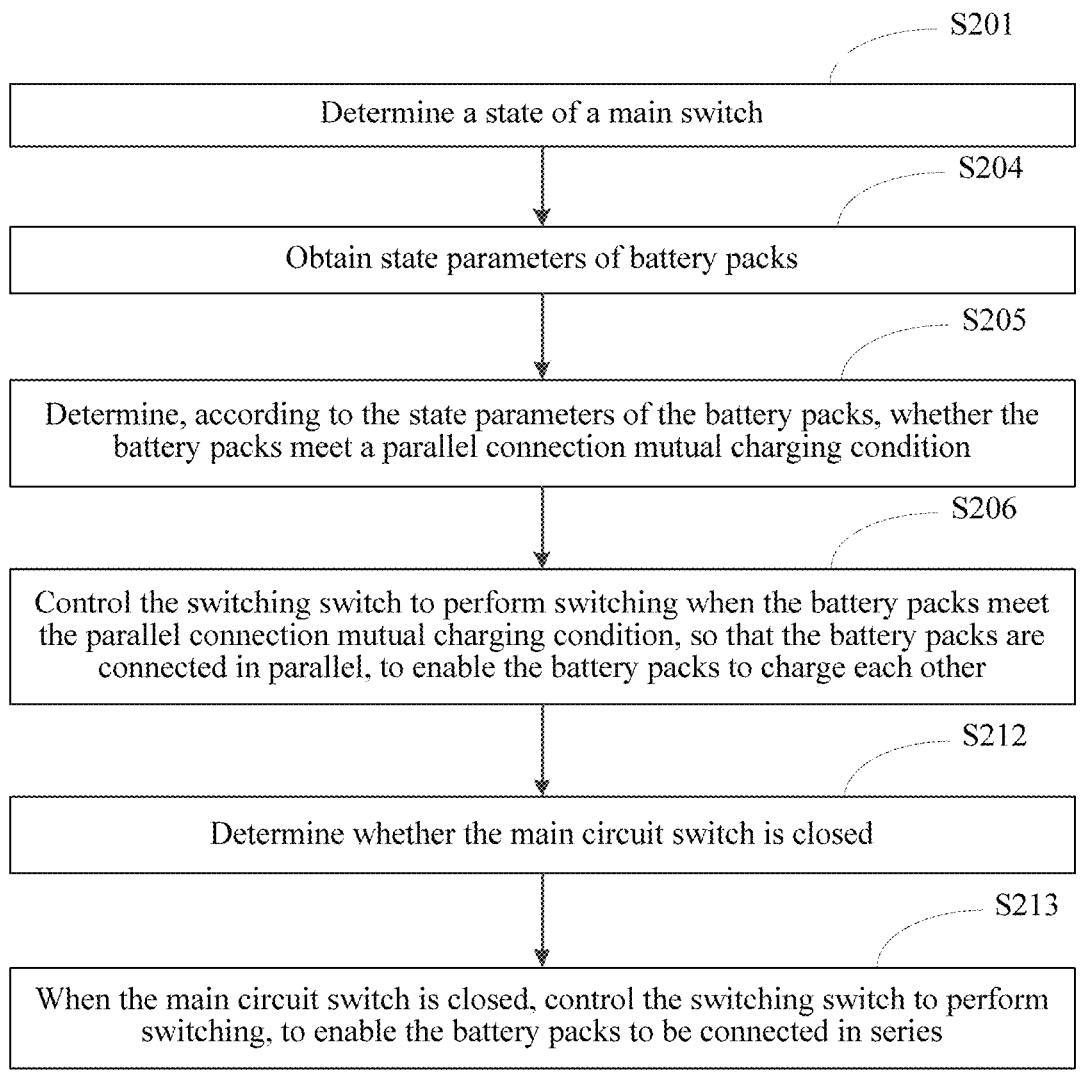
FIG. 14 is a flowchart of a configuration of a control assembly of an electric tool according to an embodiment disclosed in the present invention.

FIG. 14 is a flowchart of a configuration of a control assembly of an electric tool according to an embodiment of the present disclosure. As shown in FIG. 14, in a possible implementation, the control assembly 13 is further configured to perform the following steps after step S206.

Step S212: Determine whether the main circuit switch is closed.

Step S213: When the main circuit switch is closed, control the switching switch to perform switching, to enable the battery packs to be connected in series.

For example, in a process in which the battery packs are in parallel and charge each other, the control assembly 13 may determine an open state or a closed state of the main circuit switch 121 in step S212. If the main circuit switch 121 maintains open (for example, a user does not press the switch button), the battery packs are kept connected in parallel to charge each other. If the main circuit switch 121 is closed (for example, the user presses the switch button), the control assembly 13 may control the switching switch 112 to perform switching in step S213, so that the battery packs are connected in series. For example, as shown in FIG. 8*a*, the control assembly 13 may control contacts of the two switching switches 112 to separately switch to a position 2, so that a system circuit is equivalent to the circuit shown in FIG. 8*b*. That is, the plurality of battery packs are connected in series. In this manner, when the main circuit switch 121 is closed, the battery packs are connected in series to supply power to the motor 14, to ensure normal work of the motor 14.

As shown in FIG. 9, in a possible implementation, the system further includes:

a first switch assembly 17, located between the battery assembly 11 and the motor 14, and connected to the control signal output terminal of the control assembly 13.

Figure 15:
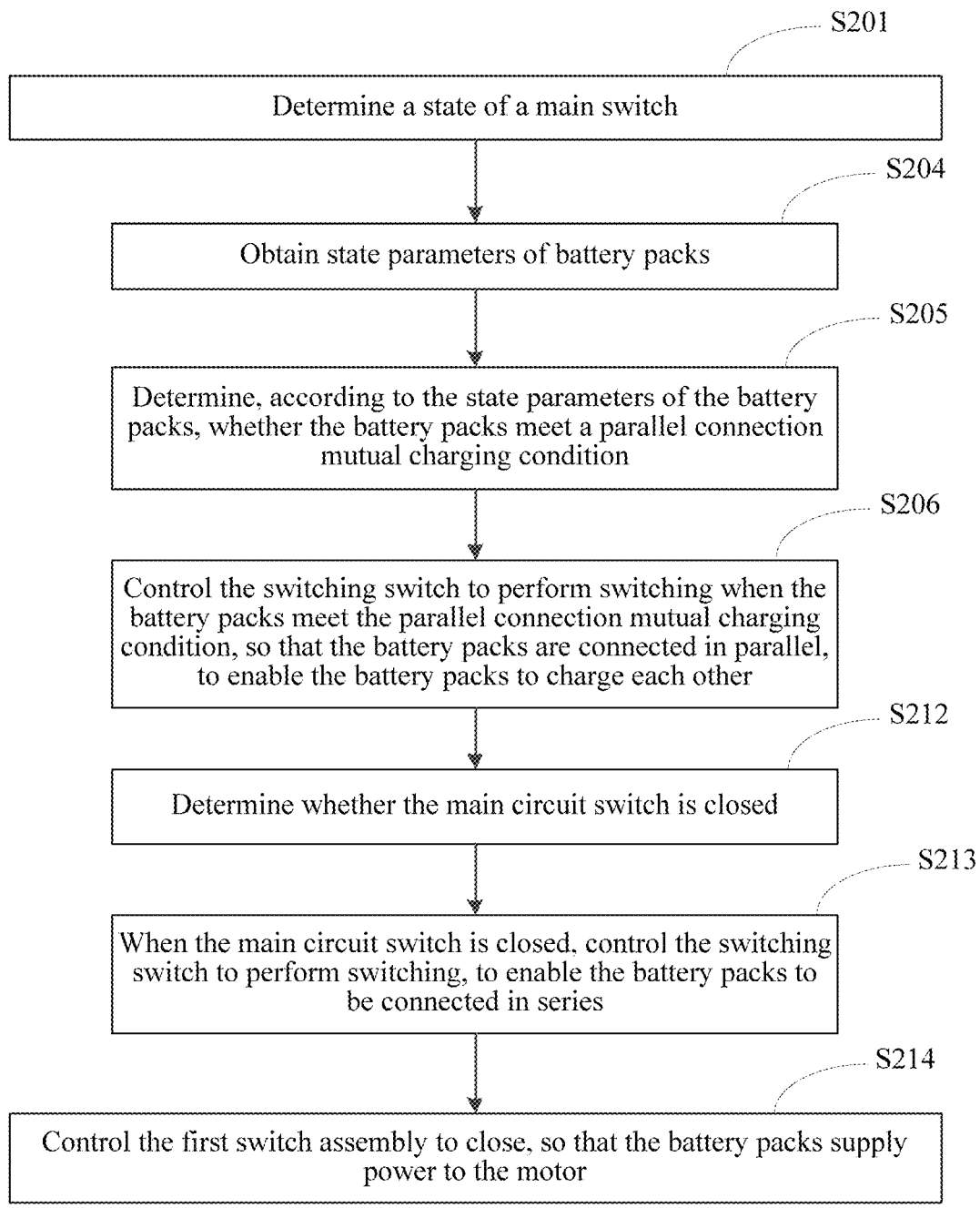
FIG. 15 is a flowchart of a configuration of a control assembly of an electric tool according to an embodiment disclosed in the present invention.

FIG. 15 is a flowchart of a configuration of a control assembly of an electric tool according to an embodiment of the present disclosure. As shown in FIG. 15, in a possible implementation, the control assembly 13 is further configured to perform the following steps after step S213.

Step S214. Control the first switch assembly to close, so that the battery packs supply power to the motor.

For example, the first switch assembly 17 may be disposed between the battery assembly 11 and the motor 14. The first switch assembly 17 may further be connected to the control signal output terminal of the control assembly 13. The first switch assembly 17 may include, for example, a switch circuit of one or more MOS transistors. The circuit may be opened or closed under the control of the control signal of the control assembly 13.

In a possible implementation, if the main circuit switch 121 is open, the control assembly 13 may output the control signal to control the first switch assembly 17 to open (for example, the control signal output terminal of the control assembly outputs a low level to the first switch assembly 17). If the main circuit switch 121 is closed (the user presses the switch button), the control assembly 13 controls the switching switch to perform switching in step S203 or step S213, so that the battery packs are connected in series. In this case, the control assembly 13 may output the control signal to control the first switch assembly 17 to close in step S214 (for example, the control signal output terminal of the control assembly outputs a high level to the first switch assembly 17), so that the entire circuit is closed to enable the battery packs to supply power to the motor.

Figure 16:
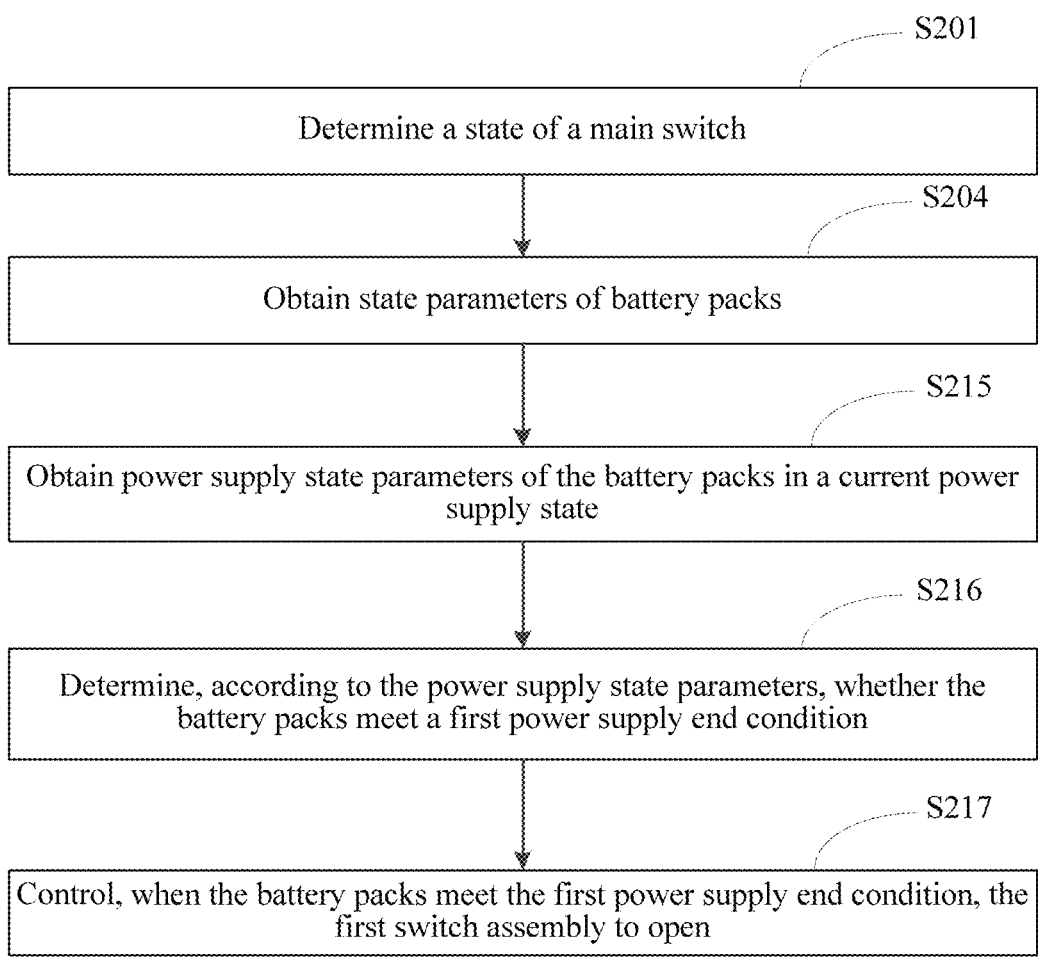
FIG. 16 is a flowchart of a configuration of a control assembly of an electric tool according to an embodiment disclosed in the present invention.

FIG. 16 is a flowchart of a configuration of a control assembly of an electric tool according to an embodiment of the present disclosure. As shown in FIG. 16, in a possible implementation, the control assembly 13 is further configured to perform the following steps after step S204.

Step S215: Obtain power supply state parameters of the battery packs in a current power supply state.

Step S216: Determine, according to the power supply state parameters, whether the battery packs meet a first power supply end condition.

Step S217: Control, when the battery packs meet the first power supply end condition, the first switch assembly to open.

For example, in a process in which the first switch assembly 17 is closed, the entire circuit is closed, and the battery packs supply power to the motor, the parameter measurement module 113 may measure the power supply state parameters of the battery packs in the current power supply state. The power supply state parameters may include the power supply state parameters, for example, temperatures, voltages, and powers, of the plurality of battery packs. In step S215, the control assembly 13 may obtain in real time the power supply state parameters measured by the parameter measurement module 113. The control assembly 13 may determine, according to the power supply state parameters, whether the battery packs meet the first power supply end condition in step S216.

In a possible implementation, the first power supply end condition may include at least one of the following:

voltages of all battery packs are less than or equal to an over-discharging protection voltage threshold;

the temperature of at least one battery pack is greater than or equal to an overheating protection voltage threshold; or a power supply current of the electric tool is greater than or equal to an over-current protection current threshold.

For example, in a process in which the battery packs supply power to the motor, the powers of the battery packs gradually decrease, and the voltages of the battery packs gradually decrease. If the voltages of all the battery packs are all less than a particular threshold, the battery packs may be damaged if power supply continues, and the battery packs may fail to meet a power supply requirement of the motor. In this way, the control assembly 13 may determine, according to the voltages of the battery packs in the power supply state parameters, whether the plurality of battery packs meet the first power supply end condition in step S216. If the voltages of all the battery packs are less than or equal to the over-discharging protection voltage threshold, the control assembly 13 may determine that the battery packs meet the first power supply end condition. The over-discharging protection voltage threshold may be set according to actual conditions. This is not limited in the present disclosure.

In a possible implementation, in step S217, the control assembly 13 may control the first switch assembly 17 to open, so that the motor stops working, thereby preventing the battery packs from being damaged, and improving the safety of the system. In this case, it may be determined that the battery packs cannot supply power to the motor again, so that the control assembly 13 may control the self-locking control assembly 16 to open (the circuit is killed), and the battery assembly 11 is disconnected from the power supply circuit of the control assembly 13. No power is supplied to the control assembly 13, and the control assembly 13 enters the static low power consumption mode.

In a possible implementation, in a process in which the battery packs supply power to the motor, temperatures of the battery packs may increase. If the temperature of a battery pack is greater than a particular threshold, the battery packs may be damaged if power supply continues. In this way, the control assembly 13 may determine, according to the temperatures of the battery packs in the power supply state parameters, whether the plurality of battery packs meet the first power supply end condition in step S216. If the temperature of the at least one battery pack is greater than or equal to the overheating protection voltage threshold, the control assembly 13 may determine that the battery packs meet the first power supply end condition. The overheating protection voltage threshold may be set according to actual conditions. This is not limited in the present disclosure.

In a possible implementation, in step S217, the control assembly 13 may control the first switch assembly 17 to open, so that the motor stops working, thereby preventing the battery packs from being damaged and improving the safety of the system. In this case, the battery packs may supply power to the motor again after being cooled. In this way, after a particular time interval (for example, an interval of 2 s), the control assembly 13 may perform step S216 again, and determine whether the plurality of battery packs meet the first power supply end condition. If the main circuit switch 121 is closed, and the temperatures of the battery packs are less than the overheating protection voltage threshold, the control assembly 13 may control the first switch assembly 17 to close, to enable the motor to continue to work.

In a possible implementation, in a process in which the battery packs supply power to the motor, the power supply current may become excessively large. If a power supply current of the electric tool is greater than a particular threshold, the battery packs may be damaged if power supply continues. In this way, the control assembly 13 may determine, according to power supply currents of the system in the power supply state parameters, whether the battery packs meet the first power supply end condition in step S216. If the power supply currents of the system are greater than or equal to the over-current protection current threshold, the control assembly 13 may determine that the battery packs meet the first power supply end condition. The over-current protection current threshold may be set according to actual conditions. This is not limited in the present disclosure.

In a possible implementation, in step S217, the control assembly 13 may control the first switch assembly 17 to open, so that the motor stops working, thereby preventing the battery packs from being damaged. In this case, the battery packs may supply power to the motor again. In this way, when the main circuit switch 121 is opened and closed again (the user releases the switch button and presses again), the control assembly 13 may control the first switch assembly 17 to be turned on, to enable the motor to continue to work. During power supply, the control assembly 13 may perform step S216 again, and determine whether the plurality of battery packs meet the first power supply end condition.

Figure 17:
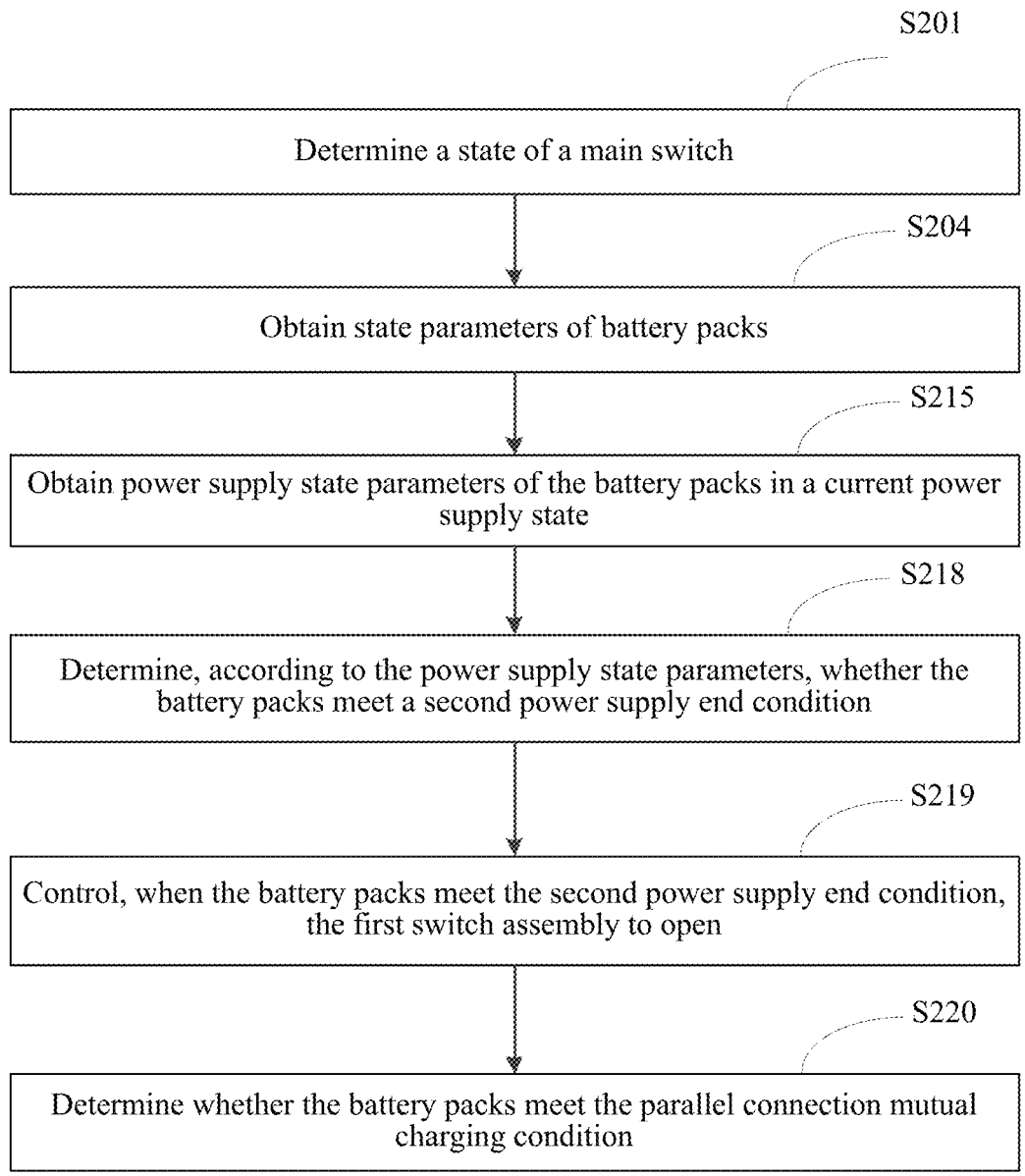
FIG. 17 is a flowchart of a configuration of a control assembly of an electric tool according to an embodiment disclosed in the present invention.

FIG. 17 is a flowchart of a configuration of a control assembly of an electric tool according to an embodiment of the present disclosure. As shown in FIG. 17, in a possible implementation, the control assembly 13 is further configured to perform the following steps after step S215.

Step S218: Determine, according to the power supply state parameters, whether the battery packs meet a second power supply end condition.

Step S219: Control, when the battery packs meet the second power supply end condition, the first switch assembly to open.

Step S220: Determine whether the battery packs meet the parallel connection mutual charging condition.

In a possible implementation, the second power supply end condition may include:
the voltage of at least one battery pack is less than or equal to an over-discharging protection voltage threshold, and the voltage of at least one battery pack is greater than the over-discharging protection voltage threshold.

For example, in a process in which the battery packs supply power to the motor, the power of the battery packs and the voltage of the battery packs decrease gradually. If voltages of some battery packs are less than a threshold (the over-discharging protection voltage threshold), and voltages of some battery packs are greater than the threshold, the battery packs may be damaged if power supply continues. In this way, the control assembly 13 may determine, according to the voltages of the battery packs in the power supply state parameters, whether the plurality of battery packs meet the second power supply end condition in step S218.

In a possible implementation, if the voltage of at least one battery pack is less than or equal to an over-discharging protection voltage threshold, and the voltage of at least one battery pack is greater than the over-discharging protection voltage threshold, the control assembly 13 may determine that the battery packs meet the second power supply end condition. The over-discharging protection voltage threshold may be set according to actual conditions. This is not limited in the present disclosure.

In a possible implementation, in step S219, the control assembly 13 may control the first switch assembly 17 to open, so that the motor stops working, thereby preventing the battery packs from being damaged and improving the safety of the system. In this case, if the battery packs charge each other, the battery packs may supply power to the motor again. Therefore, the control assembly 13 may determine whether the battery packs meet the parallel connection mutual charging condition in step S220. If the battery packs meet the parallel connection mutual charging condition, step S206 can be performed, and the switching switch is controlled to switch to a state in which the battery packs are connected in parallel to enable the battery packs to charge each other. In this manner, the power supply efficiency of the electric tool is further improved.

Application Example 1

For ease of understanding of a work process of an electric tool, an application example of an electric tool of embodiments of the present disclosure is provided below. A person skilled in the art should understand that the following application example is only used for ease of understanding of embodiments of the present invention and not intended to limit the scope of the embodiments of the present invention.

Figure 18:
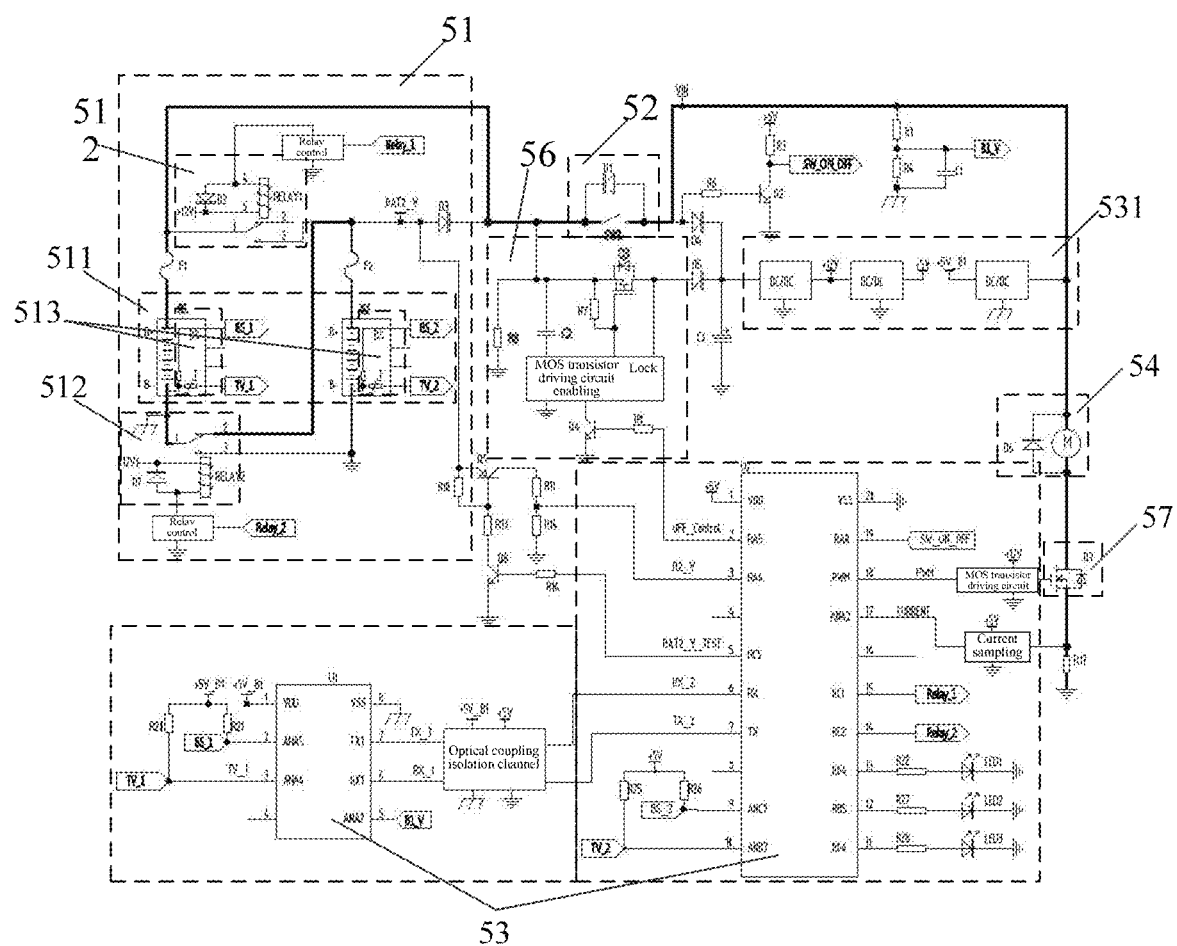
FIG. 18 is a schematic diagram of a circuit of an application example of an electric tool according to an embodiment disclosed in the present invention.

FIG. 18 is a schematic diagram of a circuit of an application example of an electric tool according to an embodiment of the present disclosure. As shown in FIG. 18, in this application example, a battery assembly 51 includes two battery pack mounting portions 511. A battery pack B1 and a battery pack B2 are separately mounted in the battery pack mounting portions 511. There is a switching switch 512 between the battery pack mounting portions 511. In this application example, the switching switch 512 may be an electromagnetic relay RELAY1 and an electromagnetic relay RELAY2. Under the control of a control assembly 53, the electromagnetic relay RELAY1 and the electromagnetic relay RELAY2 are switched between a normally closed contact and a normally open contact, so that the battery pack B1 and the battery pack B2 are switched between a series connection state and a parallel connection state.

In this application example, the battery assembly 51 further includes a parameter measurement module 513. The parameter measurement module 513 is connected to the battery pack mounting portions 511, and separately measures state parameters, for example, temperatures, voltages, and charging and discharging states, of the battery pack B1 and the battery pack B2. It should be understood that the parameter measurement module 513 may apply a measurement circuit known in the art. This is not limited in the present disclosure.

In this application example, a main circuit switch 52 is located between the battery assembly 51 and a motor 54. The main circuit switch 52 may include a switch SW1. The motor 54 may include an electric motor M. A first switch assembly 57 is connected to the motor 54 and a control signal output terminal of the control assembly 53. The first switch assembly 57 includes, for example, a MOS transistor Q7, which is turned on or off under the control of the control assembly 53.

In this application example, a self-locking control assembly 56 is located between the battery assembly 51 and the control assembly 53. When the battery pack B1 and the battery pack B2 are inserted into the battery pack mounting portions 511, a self-locking switch circuit (for example, including a MOS transistor Q3) of the self-locking control assembly 56 is turned on and locked. The battery assembly 51 is connected to a power supply circuit 531 of the control assembly 53, so that the power supply circuit 531 is powered up.

Figure 19:
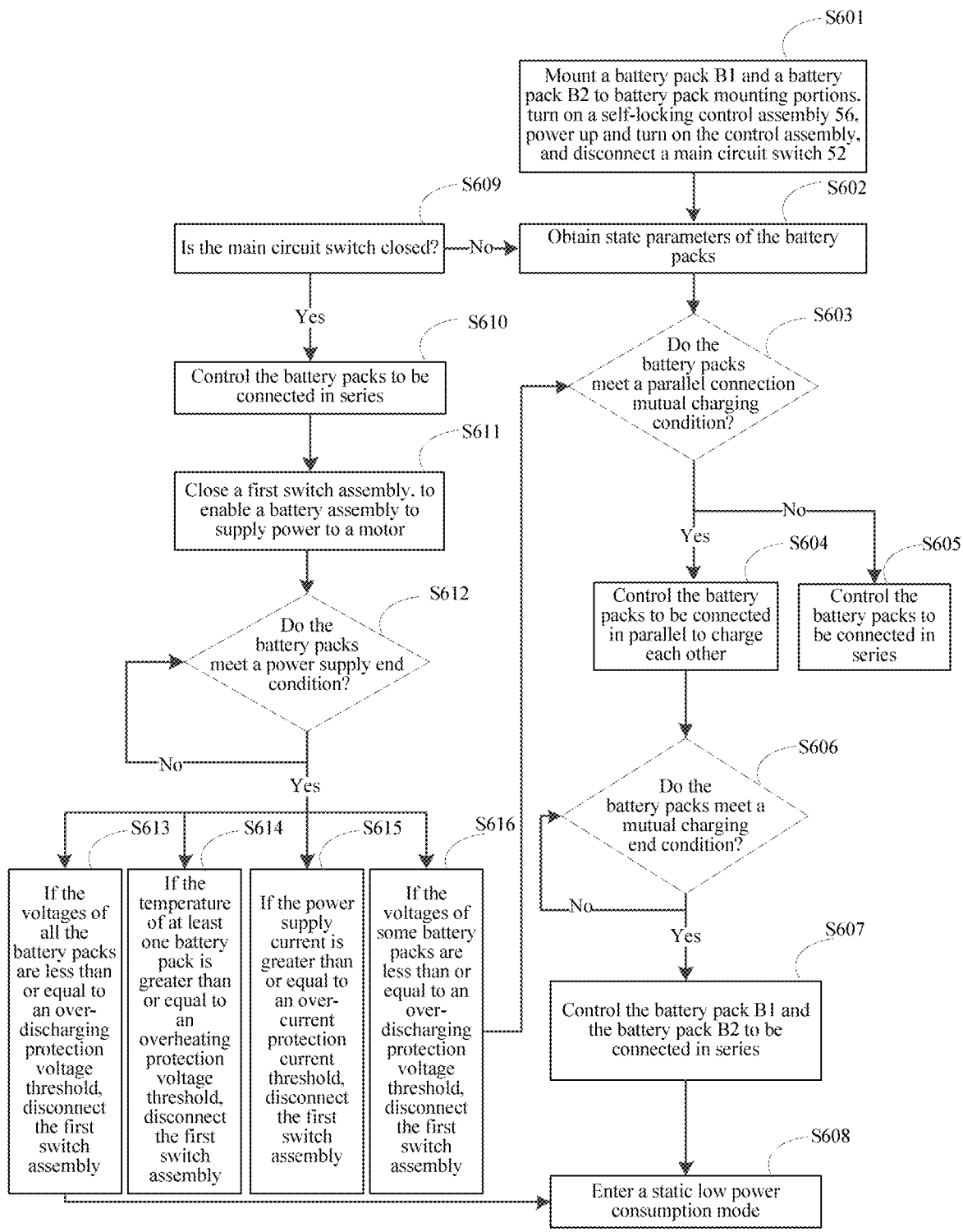
FIG. 19 is a work flowchart of an application example of an electric tool according to an embodiment disclosed in the present invention.

FIG. 19 is a work flowchart of an application example of an electric tool according to an embodiment of the present disclosure. As shown in FIG. 19, in this application example, in step S601, when the battery pack B1 and the battery pack B2 are mounted to the battery pack mounting portions 511, a capacitor C2 of the self-locking control assembly 56 in FIG. 18 is charged and short-circuited, to activate a driving circuit of the MOS transistor Q3, so that the MOS transistor Q3 is turned on. The power supply circuit 531 of the control assembly 53 is powered up, and the control assembly 53 is powered up and turned on. After the control assembly 53 is powered up and turned on, a control signal output terminal (OFF_Control) of the control assembly 53 outputs a low level to a control circuit (for example, including a bipolar junction transistor Q4) of the self-locking control assembly 56, so that the MOS transistor Q3 continues to be turned on and locked.

When the main circuit switch 52 is open, in step S602, the control assembly 53 may obtain state parameters, measured by the parameter measurement module 513, of the battery packs, and determine whether the battery pack B1 and the battery pack B2 meet a parallel connection mutual charging condition in step S603 (for example, a temperature is within a first temperature interval in which mutual charging is performed, and a voltage difference is within a first voltage difference interval in which mutual charging is performed).

If the battery packs meet the parallel connection mutual charging condition, in step S604, the control assembly 53 may control the electromagnetic relay RELAY2 to be closed. After a period of time (for example, 20 ms to 100 ms) is delayed, the electromagnetic relay RELAY1 is controlled to be closed, so that a relay contact 1 is switched from a position 2 to a position 3. Therefore, the battery pack B1 and the battery pack B2 are connected in parallel, and the battery pack B1 and the battery pack B2 begin to perform parallel connection mutual charging. In this application example, the battery assembly 51 further includes a fuse member. The fuse member includes, for example, a fuse F1 and a fuse F2 in FIG. 18, to prevent the battery packs from being short-circuited and prevent the battery packs from being damaged in a process in which the electromagnetic relay RELAY1 is closed and the electromagnetic relay RELAY is energized and switched.

Otherwise, if the battery packs do not meet the parallel connection mutual charging condition, in step S605, the control assembly 53 may control the electromagnetic relay RELAY1 to be released. After a period of time (for example, 20 ms to 100 ms) is delayed, the electromagnetic relay RELAY2 is controlled to be released, so that a relay contact 1 is switched from the position 3 to the position 2. Therefore, the battery pack B1 and the battery pack B2 are connected in series. A particular delay needs to be set for a switching between a closed state and a released state of the electromagnetic relay, thereby preventing an instantaneous short circuit.

When the battery pack B1 and the battery pack B2 are connected in parallel to charge each other, in step S606, the control assembly 53 may obtain a charging state parameter, measured by the parameter measurement module 513, of the battery pack in a current charging state, and determine whether the battery pack B1 and the battery pack B2 meet a mutual charging end condition (for example, a temperature is not in the first temperature interval in which mutual charging can be performed, and a voltage difference is within a voltage threshold in which the powers of the battery packs are balanced). If the battery packs do not meet the mutual charging end condition, the control assembly 53 repeats step S606 at a particular interval of time, and continues to determine whether the battery pack B1 and the battery pack B2 meet the mutual charging end condition.

Conversely, if the battery packs meet the mutual charging end condition, in step S607, the control assembly 53 may control the electromagnetic relay RELAY1 to be released. After a period of time (for example, 20 ms to 100 ms) is delayed, the electromagnetic relay RELAY2 is controlled to be released, so that a relay contact 1 is switched from the position 3 to the position 2. Therefore, the battery pack B1 and the battery pack B2 are connected in series. In addition, in step S608, a control signal output terminal (OFF_Control) of the control assembly 53 outputs a high level to a control circuit (for example, including a bipolar junction transistor Q4) of the self-locking control assembly 56, so that the MOS transistor Q3 is open. In this case, the battery assembly 51 is disconnected from the power supply circuit 531, the control assembly 53 has no power supply and enters the static low power consumption mode, to implement kill control of the circuit. In the static low power consumption mode, a quiescent current of the system is relatively low, so that the power consumption of the circuit can be effectively reduced.

In step S609, if the main circuit switch 52 is closed (SW1 is pressed), the control assembly 53 controls the electromagnetic relay RELAY1 to be released in step S610. After a period of time (for example, 20 ms to 100 ms) is delayed, the electromagnetic relay RELAY2 is controlled to be released, so that a relay contact 1 is switched from the position 3 to the position 2. As a result, the battery pack B1 and the battery pack B2 are connected in series. In addition, in step S611, the control assembly 53 controls the first switch assembly 57 to be turned on (the MOS transistor Q7 is turned on), the battery assembly 51 supplies power to the motor 54 (the electric motor M), and the electric tool begins to work.

In step S612, the control assembly 53 may obtain a power supply state parameter, measured by the parameter measurement module 513, of the battery pack in a current power supply state, and determine whether the battery pack B1 and the battery pack B2 meet a power supply end condition (voltages of all the battery packs are less than or equal to the over-discharging protection voltage threshold, the temperature of at least one battery pack is greater than or equal to an overheating protection voltage threshold, a power supply current in the electric tool is greater than or equal to an over-current protection current threshold or the like).

In step S613, if the voltages of all the battery packs are less than or equal to an over-discharging protection voltage threshold, the control assembly 53 disconnects the first switch assembly 57 (the MOS transistor Q7), and the motor 54 stops. In addition, a control signal output terminal (OFF_Control) of the control assembly 53 outputs a high level to a control circuit of the self-locking control assembly 56, so that the MOS transistor Q3 is open, and the control assembly 53 enters the static low power consumption mode.

In step S614, if the temperature of at least one battery pack is greater than or equal to an overheating protection voltage threshold, the control assembly 53 disconnects the first switch assembly 57 (the MOS transistor Q7), and the motor 54 stops. In addition, the control assembly 53 obtains the state parameters of the battery packs repeatedly at a particular interval of time. If the temperatures of the battery packs are less than the overheating protection voltage threshold, the first switch assembly 57 is closed, and the motor 54 returns to work.

In step S615, if the power supply current of the electric tool is greater than or equal to an over-current protection current threshold, the control assembly 53 disconnects the first switch assembly 57 (the MOS transistor Q7), and the motor 54 stops. In addition, when the main circuit switch 52 is opened and closed again, the control assembly 53 connects the first switch assembly 57, and the motor 54 returns to work.

In step S616, if the voltage of at least one battery pack is less than or equal to an over-discharging protection voltage threshold, and the voltage of at least one battery pack is greater than the over-discharging protection voltage threshold (voltages of some battery packs are less than or equal to the over-discharging protection voltage threshold), the control assembly 53 may disconnect the first switch assembly 57 (the MOS transistor Q7), and the motor 54 stops. In addition, step S603 may be performed, and the control assembly 53 may determine whether the battery packs meet the parallel connection mutual charging condition. If the battery packs meet the parallel connection mutual charging condition, the switching switch is controlled to switch to a state in which the battery packs are connected in parallel in step S604 to enable the battery packs to charge each other. In this manner, the power supply efficiency of the electric tool is further improved.

Application Example 2

For ease of understanding of a self-locking control assembly of an electric tool, an application example of an electric tool of embodiments of the present disclosure are provided below. A person skilled in the art should understand that the following application example is only used for ease of understanding of embodiments of the present invention and are not intended to limit the scope of the embodiments of the present invention.

Figure 20:
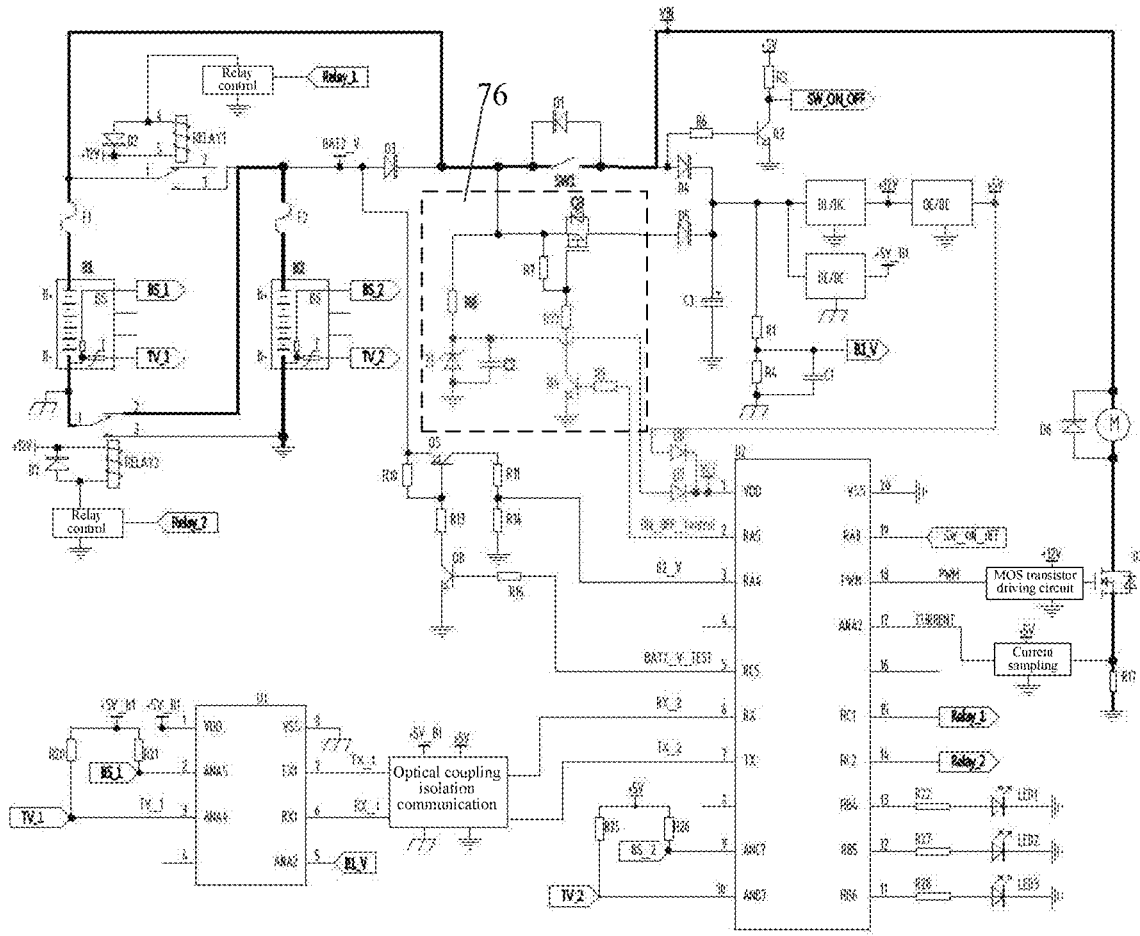
FIG. 20 is a schematic diagram of a circuit of an application example of an electric tool according to an embodiment disclosed in the present invention.

FIG. 20 is a schematic diagram of a circuit of an application example of an electric tool according to an embodiment of the present disclosure. In this application example, as shown in FIG. 20, when the battery pack B1 and the battery pack B2 is mounted to the battery pack mounting portions, the MOS transistor Q3 in a self-locking control assembly 76 is turned on, a power supply circuit (a DC/DC voltage reduction module) of the control assembly is turned on, and the control assembly is powered up and turned on. After the control assembly is powered up and turned on, a control signal output terminal (OFF_Control) of the control assembly outputs a high level to a control circuit (for example, including a bipolar junction transistor Q4) of the self-locking control assembly 76, so that the MOS transistor Q3 continues to be turned on and locked.

In this application example, when the control assembly determines the static low power consumption mode (a sleep state) needs to be entered, the control signal output terminal (OFF_Control) of the control assembly outputs a low level to a control circuit (for example, including a bipolar junction transistor Q4) of the self-locking control assembly 76, so that the MOS transistor Q3 is open, the power supply circuit of the control assembly is powered off, and work is stopped. In this case, a resistor R8 in the self-locking control assembly 76 forms a voltage-regulator tube power supply circuit with a zener diode Z1, to supply power to the control assembly. In the system, only parts (for example, U2) of the control assembly consume power, and only consumes a power of several uA. The system may consume a power of 20 uA to 30 uA in combination with the consumption of the voltage-regulator tube power supply circuit (the resistor R8 and the zener diode Z1). For example, for a battery pack of 2 Ah, the battery pack is discharged until the battery pack is empty after several years of static placement.

In this application example, when the control assembly is in the static low power consumption mode, the control assembly may be woken up at a particular interval of time. For example, the control assembly (U2) is woken up at an interval of 2 s by using an inner timer. The control signal output terminal (OFF_Control) of the control assembly outputs a high level to the control circuit (the bipolar junction transistor Q4) of the self-locking control assembly 76, so that the MOS transistor Q3 is turned on. The power supply circuit (the DC/DC voltage reduction module) of the control assembly is turned on, and the entire control assembly is powered up and turned on (both U1 and U2 work normally). In this case, the control assembly may perform steps of determining whether the main circuit switch is closed and determining whether the battery pack B1 and the battery pack B2 meet the parallel connection mutual charging condition.

In this application example, aside from a circuit structure of the self-locking control assembly 76, other parts are the same as the circuit structure and the working process of the application example 1. Therefore, details are not described again herein.

According to the electric tool of this application example of the present disclosure, it can be determined when the main circuit switch is open whether the battery packs meet the parallel connection mutual charging condition. When the battery packs meet the parallel connection mutual charging condition, the switching switch is controlled to perform switching, so that the plurality of battery packs are connected in parallel to charge each other, to implement power balancing of the plurality of battery packs, thereby extending a total work time and improving power supply efficiency.

Figure 21:
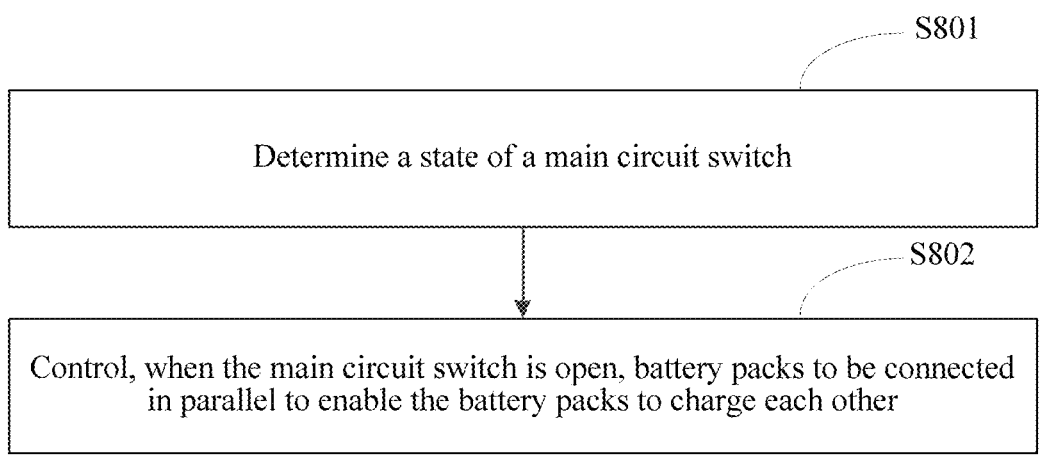
FIG. 21 is a flowchart of a power supply method according to an embodiment disclosed in the present invention.

Corresponding to the embodiments of the foregoing electric tool, the present disclosure further provides an embodiment of a power supply method. FIG. 21 is a flowchart of a power supply method according to an embodiment of the present disclosure. The power supply method of this embodiment may be applied to the foregoing electric tool. As shown in FIG. 21, the power supply method includes the following steps.

Step S801: Determine a state of the main circuit switch.

Step S802: Control, when the main circuit switch is open, battery packs to be connected in parallel to enable the battery packs to charge each other.

In a possible implementation, the method further includes the following step:
    when the main circuit switch is closed, controlling the battery packs to be connected in series.

In a possible implementation, the method further includes:
    performing, before step S802, the following steps:
    obtaining state parameters of the battery packs;
    determining, according to the state parameters of the battery packs, whether the battery packs meet a parallel connection mutual charging condition; and
    controlling, when the battery packs meet the parallel connection mutual charging condition, the battery packs to be connected in parallel to enable the battery packs to charge each other.

In a possible implementation, the method further includes the following step:
    when the battery packs do not meet the parallel connection mutual charging condition, controlling the battery packs to be in a first state in which the battery packs are prevented from performing mutual charging.

In a possible implementation, the first state is one of the following cases:
    the battery packs are connected in series to each other; or
    the battery packs are not electrically connected.

In a possible implementation, the parallel connection mutual charging condition includes at least one of the following:
    determining, based on the state parameters, that temperatures of the battery packs are within a first temperature interval in which mutual charging can be performed; or
    determining, based on the state parameters, that a voltage difference between the battery packs is within a first voltage difference interval in which mutual charging can be performed.

In a possible implementation, the method further includes:
    performing, after the controlling, when the battery packs meet the parallel connection mutual charging condition, the battery packs to be connected in parallel to enable the battery packs to charge each other, the following steps:
obtaining charging state parameters of the battery packs in a current charging state;
determining, according to the charging state parameters, whether the battery packs meet a mutual charging end condition; and controlling, when the battery packs meet the mutual charging end condition, the battery packs to be connected in series.

In a possible implementation, the mutual charging end condition includes at least one of the following:
determining, based on the charging state parameters, that temperatures of the battery packs are not in a first temperature interval in which mutual charging can be performed;
determining, based on the charging state parameters, that a voltage difference between the battery packs is within a voltage threshold of power balancing between the battery packs; or
determining, based on the charging state parameters, that a single battery voltage in the battery packs is not in a safe voltage interval.

In a possible implementation, the method further includes:
performing, after the step of determining, according to the charging state parameters of the battery packs, whether the battery packs meet a mutual charging end condition, the following step:
entering, when the battery packs meet the mutual charging end condition, a static low power consumption mode.

In a possible implementation, the method further includes:
performing, after the controlling, when the battery packs meet the parallel connection mutual charging condition, the battery packs to be connected in parallel to enable the battery packs to charge each other, the following steps:
determining whether the main circuit switch is closed; and controlling, when the main circuit switch is closed, the battery packs to be connected in series.

In a possible implementation, the method further includes:
performing, after the step of controlling, when the main circuit switch is closed, the battery packs to be connected in series, the following steps:
controlling the battery packs to be electrically connected to a motor, so that the battery packs supply power to the motor.

In a possible implementation, the method further includes:
performing, after the step of controlling the battery packs to be electrically connected to the motor, so that the battery packs supply power to the motor, the following steps:
obtaining power supply state parameters of the battery packs in a current power supply state;
determining, according to the power supply state parameters, whether the battery packs meet a first power supply end condition; and
controlling, when the battery packs meet the first power supply end condition, a first switch assembly to open.

In a possible implementation, the first power supply end condition includes at least one of the following:
voltages of all the battery packs are less than or equal to an over-discharging protection voltage threshold;
the temperature of at least one battery pack is greater than or equal to an overheating protection voltage threshold; or
a power supply current of the electric tool is greater than or equal to an over-current protection current threshold.

In a possible implementation, the method further includes the following steps:
performing, after the step of obtaining power supply state parameters of the battery packs in a current power supply state, the following steps:
determining, according to the power supply state parameters, whether the battery packs meet a second power supply end condition;
controlling, when the battery packs meet the second power supply end condition, the first switch assembly to open; and determining whether the battery packs meet the parallel connection mutual charging condition, where
the second power supply end condition includes:
the voltage of at least one battery pack is less than or equal to an over-discharging protection voltage threshold, and the voltage of at least one battery pack is greater than the over-discharging protection voltage threshold.

Corresponding to the embodiments of the foregoing electric tool, the present disclosure further provides an electric tool. The electric tool includes the electric tool described above, which supplies power to the electric tool through the battery packs mounted to the electric tool.

According to this embodiment of the present disclosure, when the main circuit switch is open, it may be determined whether the battery packs meet the parallel connection mutual charging condition. When the battery packs meet the parallel connection mutual charging condition, the switching switch is controlled to perform switching, so that the plurality of battery packs are connected in parallel to charge each other, to implement power balancing of the plurality of battery packs, thereby extending a total work time and improving power supply efficiency.

The present disclosure may be a system, a method and/or a computer program product. The computer program product may include a computer-readable storage medium, storing computer-readable program instructions configured to cause a processor to implement aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanically encoded device such as punch cards or raised structures in a groove having instructions recorded thereon, and any suitable combination of the foregoing. The computer-readable storage medium, as used herein, is not to be construed as being transitory signals perse, such as radio waves or other freely propagating electromagnetic waves, electromagnetic waves propagating through a waveguide or other transmission media (for example, light pulses passing through a fiber-optic cable), or electrical signals transmitted through a wire.

Computer-readable program instructions described herein may be downloaded to computing/processing devices from the computer-readable storage medium or to an external computer or external storage device via a network, for example, the Internet, a local area network (LAN), a wide area network (WAN) and/or a wireless network. The network may include copper transmission cables, optical transmission fibers, wireless transmission, routers, firewalls, switches, gateway computers and/or edge servers. A network adapter card or a network interface in each computing/processing device receives computer-readable program instructions from the network and forwards the computer-readable program instructions for storage in the computer-readable storage medium within the computing/processing device.

The computer program instructions used to perform operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA) or programmable logical arrays (PLA), may execute the computer-readable program instructions by utilizing state information of the computer-readable program instructions to personalize the electronic circuitry, in order to perform aspects of the present disclosure.

Aspects of the present disclosure are described with reference to flowcharts and/or block diagrams of methods, apparatuses (systems), and computer program products according to embodiments of the present disclosure. It should be understood that each block of the flowcharts and/or block diagrams, and combinations of blocks in the flowcharts and/or block diagrams, may be implemented by the computer-readable program instructions.

These computer-readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in one or more blocks of the flowcharts and/or block diagrams. These computer-readable program instructions may also be stored in a computer-readable storage medium the can direct a computer, a programmable data processing apparatus and/or other devices to function in a particular manner, such that the computer-readable storage medium storing the instructions includes an article of manufacture including instructions which implement aspects of the function/act specified in one or more blocks of the flowcharts and/or block diagrams.

The computer-readable program instructions may also be loaded onto a computer, other programmable data processing apparatus or other device to cause a series of operational steps to be performed on the computer, other programmable data processing apparatus or other device, such that the instructions which execute on the computer, other programmable data processing apparatus, or other device implement the functions/acts specified in one or more blocks of the flowcharts and/or block diagrams.

The flowcharts and block diagrams in the accompanying drawings show the architecture, functionality, and operation of possible implementations of systems, methods, and computer program products according to various embodiments of the present disclosure. In this regard, each block in the flowchart or block diagrams may represent a module, a program segment, or a portion of instructions, which includes one or more executable instructions for implementing the specified logic functions. In some alternative implementations, the functions noted in the block may occur out of the order note in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts and combinations of blocks in the block diagrams and/or flowcharts, can be implemented by special purpose hardware-based systems that perform the specified functions or acts or may implement combinations of special purpose hardware and computer instructions.

The embodiments of the present disclosure have been described above. The foregoing descriptions are exemplary instead of exhaustive, and are not limited to the disclosed embodiments. Many modifications and changes are apparent to a person of ordinary skill in the art without departing from the scope and spirit of the described embodiments. Terms used in this specification are selected to best explain the principles of the embodiments, actual applications, or technical improvements of technologies in the market, or to enable another person of ordinary skill in the art to understand the embodiments disclosed in this specification.

What is claimed is:

1. An electric tool, comprising:
   a housing;
   a motor, accommodated in the housing;
   battery pack mounting portions, at least two battery packs being detachably mounted in the battery pack mounting portions, wherein each of the battery packs comprises a battery pack housing and a plurality of cells disposed in the battery pack housing;
   a main switch, being in an open state or a closed state according to an operation of a user, wherein when the main switch is in a closed state, the battery packs are capable of supplying power to the motor, and when the main switch is in an open state, the battery packs stop supplying power to the motor; and
   a control assembly, detecting a state of the main switch, wherein when the main switch is in an open state, the control assembly controls transfer of electric energy of a battery pack with a high voltage to a battery pack with a low voltage of the at least two battery packs;
   a parameter measurement module, wherein the parameter measurement module is electrically connected to the control assembly, the control assembly obtains state parameters, detected by the parameter measurement module, of the battery packs, and determines whether the parameters of the battery packs meet a preset condition, and when the state parameters of the battery packs meet the preset condition, the control assembly controls transfer of electric energy of a battery pack with a high voltage to a battery pack with a low voltage of the at least two battery packs;

a self-locking control assembly, wherein one end of the self-locking control assembly is connected to the battery packs, the other end is separately connected to the main switch and the control assembly, the self-locking control assembly comprises a capacitor assembly and a MOS transistor, a first end of the capacitor assembly is separately connected to the battery packs, the main switch, and the MOS transistor, and a second end of the capacitor is connected to the control assembly, when the battery packs are mounted into the battery pack mounting portions, the capacitor assembly is charged, and the MOS transistor is turned on, so that the battery packs provide power to the control assembly, and when the state parameters of the battery packs do not meet the preset condition, the control assembly controls the MOS transistor to open, so that the self-locking control assembly is open, to enable the control assembly to enter a static low power consumption mode.

2. The electric tool according to claim 1, further comprising a switching switch connected to the battery pack mounting portions, wherein the control assembly controls the switching switch to switch between a first state and a second state, and when the main switch is in an open state, the control assembly controls the switching switch to switch to the first state, so that the at least two battery packs are connected in parallel to enable a battery pack with a high voltage to charge a battery pack with a low voltage;

wherein when the main switch is in a closed state, the control assembly controls the switching switch to switch to the second state, so that the at least two battery packs are connected in series to supply power to the motor.

3. The electric tool according to claim 1, further comprising a balancing transformer and a balancing switch, wherein the balancing transformer is a multi-winding same-core transformer, the at least two battery packs are separately connected to a winding of the same-core transformer through two balancing switches, and when the main switch is in an open state, the control assembly controls two balancing switch connected to the low-voltage battery pack to close, so that the at least two battery packs are connected in series to enable a battery pack with a high voltage to charge a battery pack with a low voltage through the balancing transformer;

wherein when the main switch is in a closed state, the control assembly controls two balancing switch connected to the low-voltage battery pack to close, so that the at least two battery packs are connected in series to enable a battery pack with a high voltage to charge a battery pack with a low voltage through the balancing transformer.

4. The electric tool according to claim 2, wherein the main switch comprises the switching switch, the main switch is a single-pole multi-throw switch formed by linkage of a first switch, a second switch, and a third switch, the first switch is electrically connected to the battery packs and the motor, the second switch and the third switch are separately located between the at least two battery packs, and when the first switch is in an open state according to an operation of the user, the linked second switch and third switch are separately in the first state, so that the at least two battery packs are connected in parallel to enable a battery pack with a high voltage to charge a battery pack with a low voltage.

5. The electric tool according to claim 4, further comprising a fourth switch, wherein one end of the fourth switch is connected to the second switch of the single-pole multi-throw switch, the other end is connected to the first switch of the single-pole multi-throw switch and negative electrodes of one of the battery packs, and when the main switch is in an open state, and the control assembly controls the fourth switch to close when the parameters of at least two battery packs meet a preset condition, and controls the at least two battery packs to be connected in parallel to enable a battery pack with a high voltage to charge a battery pack with a low voltage.

6. The electric tool according to claim 2, further the switching switch comprising at least two switching switches separately connected between the at least two battery packs, wherein the control assembly controls states of the at least two switching switches, and when the main switch is in an open state, the control assembly controls the switching switch to be in the first state, so that the at least two battery packs are connected in parallel to enable a battery pack with a high voltage to charge a battery pack with a low voltage.

7. The electric tool according to claim 6, wherein the at least two battery packs comprise a first battery pack and a second battery pack, the at least two switching switch comprises a first switching switch and a second switching switch, the control assembly comprises a bidirectional power supply, and the bidirectional power supply comprises a first input terminal, a second input terminal, a first output terminal, and a second output terminal, the first input terminal is electrically connected to a positive electrode of the first battery pack by the first switching switch, the first output terminal is electrically connected to a negative electrode of the first battery pack, the second input terminal is electrically connected to a positive electrode of the second battery pack, the second output terminal is electrically connected to a negative electrode of the second battery pack by the second switching switch, and when the main switch is open, the control assembly controls the first switching switch and the second switching switch to be separately in the first state, so that the bidirectional power supply controls a battery pack with a high voltage to charge a battery pack with a low voltage by using a preset charging current;

wherein when the main switch is in a closed state, the control assembly controls the first switching switch and the second switching switch to be separately in the second state, and the at least two battery packs are connected in series to supply power to the motor.

8. The electric tool according to claim 1, wherein the preset condition comprises at least one of the following:

determining, based on the state parameters, that temperatures of the battery packs are within a first temperature interval in which mutual charging can be performed; or determining, based on the state parameters, that a voltage difference between the battery packs is within a first voltage difference interval in which mutual charging can be performed.

9. A power supply method for an electric tool, the electric tool comprise battery pack mounting portions, at least two battery packs being detachably mounted in the battery pack mounting portions, a main switch, being in an open state or a closed state according to an operation of a user, the electric tool further comprising a switching switch connected to the battery pack mounting portions, the control assembly controls the switching switch to switch between a first state and a second state, the method comprising the following steps:
- determining a state of a main switch; and
- when the main switch is in an open state, obtaining state parameters of the battery packs;
- determining, according to the state parameters of the battery packs, whether the battery packs meet a preset condition;
- controlling, by the control assembly when the parameters of the battery packs meet the preset condition, transfer of electric energy of a battery pack with a high voltage to a battery pack with a low voltage of the at least two battery packs;
- controlling, by the control assembly when the battery packs do not meet the preset condition, the at least two battery packs to be connected in series to each other or to be not electrically connected;
- obtaining charging state parameters of the battery packs in a current charging state;
- determining, according to the charging state parameters of the battery packs, whether the battery packs meet a mutual charging end condition;
- controlling, when the battery packs meet the mutual charging end condition, the switching switch to be in a second state, so that the at least two battery packs are connected in series to supply power to the motor.

10. The power supply method for an electric tool according to claim 9, wherein the step of controlling, when the main switch is in an open state, transfer of electric energy of a battery pack with a high voltage to a battery pack with a low voltage of at least two battery packs further comprises:
- controlling, when the main switch is in an open state, the switching switch to switch to a first state, so that the at least two battery packs are connected in parallel to enable a battery pack with a high voltage to charge a battery pack with a low voltage;
- controlling, when the main switch is in a closed state, the switching switch to switch to a second state, so that the at least two battery packs are connected in series to supply power to a motor.

11. The power supply method for an electric tool according to claim 9, the electric tool further comprising a balancing transformer and a balancing switch, the balancing transformer is a multi-winding same-core transformer, the at least two battery packs are separately connected to a winding of the same-core transformer through two balancing switches, wherein the step of controlling, when the main switch is in an open state, transfer of electric energy of a battery pack with a high voltage to a battery pack with a low voltage of at least two battery packs further comprises:
- controlling, when the main switch is in an open state, two balancing switch connected to the low-voltage battery pack to close, so that the at least two battery packs are connected in series to enable a battery pack with a high voltage to charge a battery pack with a low voltage through a balancing transformer;
- controlling, when the main switch is in a closed state, two balancing switch connected to the low-voltage battery pack to close, so that the at least two battery packs are connected in series to enable a battery pack with a high voltage to charge a battery pack with a low voltage through the balancing transformer.

12. The power supply method for an electric tool according to claim 10, wherein the step of controlling, when the main switch is in an open state, a switching switch to switch to a first state, so that the at least two battery packs are connected in parallel to enable a battery pack with a high voltage to charge a battery pack with a low voltage further comprises:
- controlling, by a control assembly when the main switch is in an open state, the at least two switching switches to switch to the first state, so that the at least two battery packs are connected in parallel to enable a battery pack with a high voltage to charge a battery pack with a low voltage by using a preset charging current.

13. The power supply method for an electric tool according to claim 9, wherein a preset condition comprises at least one of the following:
- determining, based on state parameters, that temperatures of the battery packs are within a first temperature interval in which mutual charging can be performed; or
- determining, based on state parameters, that a voltage difference between the battery packs is within a first voltage difference interval in which mutual charging can be performed.

14. The power supply method for an electric tool according to claim 9, wherein the mutual charging end condition comprises at least one of the following:
- determining, based on the charging state parameters, that temperatures of the battery packs are not in a first temperature interval in which mutual charging can be performed;
- determining, based on the charging state parameters, that a voltage difference between the battery packs is within a voltage threshold of power balancing between the battery packs; or
- determining, based on the charging state parameters, that a single battery voltage in the battery packs is not in a safe voltage interval.

* * * * *